(12) United States Patent
Wakizaka et al.

(10) Patent No.: US 8,852,788 B2
(45) Date of Patent: Oct. 7, 2014

(54) POROUS MEMBRANE FOR A SECONDARY BATTERY AND A SECONDARY BATTERY

(75) Inventors: Yasuhiro Wakizaka, Tokyo (JP); Nobukazu Kaihatsu, Tokyo (JP)

(73) Assignee: Zeon Corporation, Tokyo (JP)

( * ) Notice: Subject to any disclaimer, the term of this patent is extended or adjusted under 35 U.S.C. 154(b) by 134 days.

(21) Appl. No.: 13/499,123

(22) PCT Filed: Sep. 29, 2010

(86) PCT No.: PCT/JP2010/066961
§ 371 (c)(1),
(2), (4) Date: Mar. 29, 2012

(87) PCT Pub. No.: WO2011/040474
PCT Pub. Date: Apr. 7, 2011

(65) Prior Publication Data
US 2012/0189898 A1    Jul. 26, 2012

(30) Foreign Application Priority Data

Sep. 30, 2009    (JP) .................................. 2009-226410

(51) Int. Cl.
| | | |
|---|---|---|
| *H01M 2/16* | (2006.01) | |
| *H01M 2/18* | (2006.01) | |
| *H01M 4/13* | (2010.01) | |
| *H01M 2/14* | (2006.01) | |
| *H01M 10/0525* | (2010.01) | |

(52) U.S. Cl.
CPC .......... *H01M 2/1686* (2013.01); *H01M 2/1653* (2013.01); *H01M 4/13* (2013.01); *H01M 10/0525* (2013.01); *H01M 2/1646* (2013.01); *H01M 2/145* (2013.01); *Y02E 60/122* (2013.01)
USPC .......................................... 429/144; 429/145

(58) Field of Classification Search
CPC ... H01M 2/1653; H01M 2/1686; H01M 4/13; H01M 10/0525; H01M 2/1646; H01M 2/145
USPC ................................................ 429/144, 145
See application file for complete search history.

(56) References Cited

U.S. PATENT DOCUMENTS

| | | | |
|---|---|---|---|
| 2003/0113626 A1 | 6/2003 | Maeda et al. | |
| 2006/0115730 A1 | 6/2006 | Taniguchi et al. | |
| 2006/0194116 A1 | 8/2006 | Suzuki et al. | |
| 2006/0216608 A1 | 9/2006 | Ohata et al. | |
| 2007/0055023 A1 | 3/2007 | Han et al. | |

FOREIGN PATENT DOCUMENTS

| | | |
|---|---|---|
| CN | 101542779 B | 8/2012 |
| JP | 2002-117834 A | 4/2002 |
| JP | 2005-222780 A | 8/2005 |
| JP | 2006-185887 A | 7/2006 |
| JP | 2006-519883 A | 8/2006 |
| JP | 2007-35541 A | 2/2007 |
| JP | 2008-234879 A | 10/2008 |
| WO | WO 98/39808 A1 | 9/1998 |
| WO | WO 2005/029614 A1 | 3/2005 |
| WO | WO 2008/097013 A1 | 8/2008 |
| WO | WO 2009/123168 A1 | 10/2009 |
| WO | WO 2010/074202 A1 | 7/2010 |

OTHER PUBLICATIONS

International Search Report issued in PCT/JP2010/066961 dated Dec. 28, 2010.
Notification of transmittal of translation of the international preliminary report on patentability dated May 18, 2012 (Forms PCT/IB/338, PCT/ISA/237 and PCT/IB/373).
Extended European Search Report for European Application No. 10820589.9, dated Jul. 8, 2013.
Translation of Japanese Office Action of May 27, 2014 in counterpart Japanese Application JP 2009-226410.
Partial Translation of Chinese Office Action mailed Jan. 24, 2014 in counterpart Chinese Application.

*Primary Examiner* — Helen O Conley
(74) *Attorney, Agent, or Firm* — Birch, Stewart, Kolasch & Birch, LLP

(57) ABSTRACT

Disclosed is a porous membrane used for a secondary battery, such as lithium-ion secondary battery, wherein strength is improved and break is difficult to occur while maintaining lithium-ion conductivity. The porous membrane for a secondary battery comprising a binder for the porous membrane and a nonconductive particle, wherein the binder for the porous membrane is a polymer particle having a hetero phase structure, in which internal layer is a polymer wherein vinyl monomer components are polymerized and outer layer is a polymer wherein monomer components containing a hydrophilic functional group are polymerized. The hydrophilic functional group is at least one selected from the group consisting sulfonic acid group, carboxyl group, hydroxyl group and epoxy group.

16 Claims, No Drawings

POROUS MEMBRANE FOR A SECONDARY BATTERY AND A SECONDARY BATTERY

TECHNICAL FIELD

The present invention relates to a porous membrane, and more specifically relates to a porous membrane having a high rate characteristic used such as for a lithium-ion secondary battery. Also, the present invention relates to a secondary battery provided with the porous membrane.

BACKGROUND ART

A lithium-ion secondary battery shows the highest energy density in commercially available batteries, and is often used particularly for small electronics. Also, in addition to the small intended purposes, it is expected to apply to an automobile. Among these, a lithium-ion secondary battery is required to increase capacity, extend lifetime and further improve safety.

A polyolefin, such as polyethylene and polypropylene, based organic separator is generally used in the lithium-ion secondary battery for preventing short circuit between a positive electrode and a negative electrode. Since the polyolefin based organic separator is melted at 200° C. or lower, volume change such as contraction and meltdown can be caused when the battery is heated to a high temperature due to inside and/or outside stimuli, resulting in short circuit between the positive electrode and the negative electrode, release of electrical energy, and the like which may cause explosion, etc.

To solve these problems, it has been proposed to form a layer including a nonconductive particle such as inorganic particle on the polyethylene organic separator or electrode.

For example, Patent Document 1 discloses a use of a porous membrane, comprising nonconductive particle and resin binder and adhered to at least either surface of positive electrode or negative electrode, as a separator. The porous membrane is formed by coating slurry comprising nonconductive particles and resin binder dissolved in a solvent, and then drying thereof. As for the resin binder used for the slurry, fluorine resin, polyolefin resin, etc. are exemplified.

Also, Patent Document 2 discloses a protective porous membrane formed by using microparticle slurry including nonconductive particle such as alumina, silica, polyethylene resin on an electrode.

Furthermore, Patent Document 3 discloses a method preventing internal short circuit due to dropping of an electrode material mixture generated during the manufacturing process of a battery with a porous membrane, by controlling expansion rate of the porous membrane or controlling distribution state of resin binders in the porous membrane in a thickness direction.

However, as is the same with Patent Document 1, even with Patent Documents 2 or 3, strength of a porous membrane is insufficient and that it may be easy to break and the porous membrane may drop from a polar plate during the manufacturing process of a battery when coating nonconductive particles such as nonorganic microparticles on an electrode without dropping. Thus, safety deteriorates which leads to induce of an internal short circuit and production yield of a battery decreases. Particularly, in case of a rolled-up shaped lithium-ion secondary battery, positive electrode and negative electrode are spirally rolled-up intervening a separator between both electrodes. A curvature radius is small at a start part of the rolling and that bending stress become large and a porous membrane is likely to break.

Accordingly, with Patent Documents 1 to 3, an electrical short circuit can be prevented and thermal contraction can be controlled by forming porous membrane including nonconductive particle such as inorganic particles. However, the strength of a porous membrane is insufficient and that it may be easy to break and the porous membrane may drop from a polar plate during the manufacturing process of a battery, thus, safety deteriorates which leads to induce of an internal short circuit and production yield of a battery decreases. Further, with any Patent Documents, it is difficult to further increase the strength of a porous membrane maintaining lithium-ion conductivity.

[Patent Document 1] Japanese Unexamined Patent Publication No. H. 10-106530 (corresponding U.S. Pat. No. 5,948,464)

[Patent Document 2] Japanese Unexamined Patent Publication No. H. 7-220759

[Patent Document 3] WO Publication No. 2005-011043 (corresponding U.S. Pat. No. 7,396,612)

SUMMARY OF INVENTION

Problem to be Solved by the Invention

Therefore, the present invention has been made by considering the above prior arts and its purpose is to provide a porous membrane used for a secondary battery, such as lithium-ion secondary battery, wherein strength is improved and break is difficult to occur while maintaining lithium-ion conductivity.

Means for Solving the Problem

As a result of keen study for solving the above problems, the present inventors have found that, dispersibility and viscosity characteristic of a slurry comprising a nonconductive particle can be controlled by using a binder comprising a specific structure and a specific functional group together with nonconductive particle, such as inorganic particles, and thus, a uniform thin membrane coating of a porous membrane while sufficiently controlling porosity became possible. As a result, strength of a porous membrane is improved and break of a porous membrane can be suppressed while maintaining lithium-ion conductivity, and come to complete the present invention.

The present invention for solving the above problems includes the following matters as the gist.

(1) A porous membrane for a secondary battery comprising a binder for porous membrane and a nonconductive particle, wherein the binder for porous membrane is a polymer particle having a hetero phase structure in which internal layer is a polymer wherein vinyl monomer components are polymerized and outer layer is a polymer wherein monomer components having a hydrophilic functional group are polymerized.

(2) The porous membrane for a secondary battery as set forth in the above (1), wherein the hydrophilic functional group is at least one selected from the group consisting of sulfonic acid group, carboxyl group, hydroxyl group and epoxy group.

(3) The porous membrane for a secondary battery as set forth in the above (1) or (2), wherein the outer layer is a polymer comprising a polymerization unit of (meth)acrylonitrile and a polymerization unit of (meth)acrylic acid esters.

(4) A slurry of porous membrane for a secondary battery comprising a binder for porous membrane, nonconductive particle and a solvent wherein the binder for porous membrane is a polymer particle having a hetero phase structure in which internal layer is a polymer wherein vinyl monomer components are polymerized and outer layer is a polymer wherein monomer components having a hydrophilic functional group are polymerize d.

(5) A manufacturing method of a porous membrane for a secondary battery comprising;

a step of coating the slurry for a porous membrane of a secondary battery comprising a binder for porous membrane, nonconductive particle and a solvent wherein the binder for porous membrane is a polymer particle having a hetero phase structure in which internal layer is a polymer wherein vinyl monomer components are polymerized and outer layer is a polymer wherein monomer components having a hydrophilic functional group are polymerized on a base material, and a step of drying the slurry coated base material.

(6) A secondary battery electrode, wherein an electrode material mixture layer comprising binder for an electrode material mixture layer and an electrode active material is adhered to a collector; and the porous membrane as set forth in any one of the above (1) to (3) is stacked on a surface of the electrode material mixture layer.

(7) A separator for a secondary battery, wherein the porous membrane as set forth in any one of the above (1) to (3) is stacked on an organic separator.

(8) A secondary battery comprising a positive electrode, a negative electrode, a separator and an electrolytic solution, wherein the porous membrane as set forth in any one of the above (1) to (3) is stacked on at least any one of the above positive electrode, negative electrode and separator.

Effects of the Invention

According to the present invention, by using a polymer particle, having a hetero phase struc ture in which internal layer is a polymer wherein vinyl monomer components are polymerized and outer layer is a polymer wherein monomer components having a hydrophilic functional group are polymerized, as a binder for a porous membrane, dispersibility and viscosity characteristic of a slurry comprising a nonconductive particle can be controlled, and a uniform thin membrane coating of a porous membrane while sufficiently controlling porosity became possible. As a result, a porous membrane, wherein strength and break are improved while highly maintaining lithium-ion conductivity, can be provided.

EMBODIMENTS OF THE INVENTION

Hereinafter, the present invention is described in detail.

A porous membrane for secondary battery of the present invention comprises a binder for porous membrane and a nonconductive particle.

(Nonconductive Particles)

The nonconductive particles of the present invention are desired to be stably present under a usage environment of a lithium-ion secondary battery, a nickel-hydrogen secondary battery and the like, and also to be electrochemically stable. For example, a variety of inorganic particles and organic particles can be used. "nonconductive particles" as is mentioned in the present invention are different from the polymer particles used for a binder.

As the inorganic particles, oxide particle such as aluminum oxide, boehmite, iron oxide, silicone oxide, magnesium oxide, titanium oxide, $BaTiO_2$, ZrO and alumina-silica composite oxide; nitride particle such as aluminum nitride, silicone nitride and boron nitride; covalent crystal particle such as silicone and diamond; poorly-soluble ion crystal particle such as barium sulfate, calcium fluoride and barium fluoride; clay such as talc and montmorillonite; particle consisting of mineral resource-derived substance or manmade substance thereof such as boehmite, zeolite, apatite, kaolin, mullite, spinel, olivine, sericite and bentonite can be used. These particles may be subjected to elemental substitution, surface treatment and solid solution formation if necessary, and may be used alone or in combination of two or more. Among these, oxide particle is preferable in view of stability in the electrolytic solution and potential stability.

As the organic particles, for example, particles comprising a variety of polymers such as polystyrene, polyethylene, polyimide, melamine-based resin, phenol-based resin, cellulose, modified cellulose (such as carboxymethyl cellulose), polypropylene, polyester (such as polyethylene terephthalate, polyethylene naphthalate and polybutylene terephthalate), polyphenylene sulfide, polyaramid, polyamide-imide, polyimide, etc. can be used. Among these, polyphenylene sulfide, polyaramid, polyamideimide and polyimide are preferable in view of stability in the electrolytic solution and potential stability. Note that the above polymers forming the particles may be used as a mixture form, a modified form, a derivative form, a random copolymer, an alternate copolymer, a graft copolymer, a block copolymer, a cross-linked form. The polymer forming the organic particles may comprise 2 or more polymers.

Nonconductive particles used in the present invention are preferably organic particles in being able to decrease metal elution and to improve a rate characteristic and a high-temperature cycle characteristic.

Also, it is possible to surface treat fine powders of conductive metals, such as carbon black, graphite, $SnO_2$, ITO and metal powder, conductive compound, and oxide, respectively, with non-electroconductive substance, so as to have electrical insulation and used as non-electroconductive powders. These non-electroconductive particles may be used in combination of two or more.

As the nonconductive particle of the present invention, it is preferable to use those in which a content of a metallic foreign substance is 100 ppm or less. When the nonconductive particle containing large amounts of metallic foreign substance or a metal ion is used, in the after-mentioned slurry for porous membrane, the metallic foreign substance or metal ion may be eluted to cause to ionically crosslink with a polymer in the slurry for porous membrane, and a slurry for porous membrane may be agglutinated, which results in reducing porosity of the porous membrane to deteriorate rate characteristics. As the above metal, it is particularly the least preferable to include Fe, Ni and Cr which is easily be ionized. Therefore, the metal content in the nonconductive particle is preferably 100 ppm or less, further preferably 50 ppm or less. The smaller the above content is, the less likely battery properties are deteriorated. The "metallic foreign substance" here indicates single metallic body other than the nonconductive particle. Content of the metallic foreign substance in the nonconductive particle can be measured by ICP (Inductively Coupled Plasma).

Average particle diameter of the nonconductive particle (D50 average particle diameter of volume average) of the present invention is preferably 5 nm or more to 10 μm or less, more preferably 10 nm or more to 5 μm or less. By making the average particle diameter of the nonconductive particle within the above range, it is easier to control the dispersion state and to obtain a membrane having a predetermined uniform thickness. When the average particle diameter of the nonconductive particle is in the range of 50 nm or more to 2

μm or less, it is particularly preferable because of good dispersion, ease of application, and excellent controlling property for void.

Also specifically, BET specific surface area of the particle is preferably 0.9 to 200 m$^2$/g, more preferably 1.5 to 150 m$^2$/g, in view of controlling agglutination of the particles and optimizing fluidity of the after-mentioned slurry for porous membrane.

The shape of the nonconductive particles used for the present invention may be, spherical, needle-shaped, rod-shaped, spindle-shaped, plate-shaped, etc., however, spherical, needle-shaped and spindle-shaped are preferable. Further, when nonconductive particles, having aspect ratio of 5 or more to 1000 or less, more preferably 7 or more to 800 or less, particularly preferably 9 or more to 600 or less, are used, it is possible to form a porous membrane in which nonconductive particles are uniformly oriented and have a high plunging strength in perpendicular direction. The aspect ratio is a value expressed by (long-direction length)/(width perpendicular to the long-direction (diameter)). The aspect ratio can be obtained by calculating [(aspect ratio)=(long-direction length)/width perpendicular to long-direction) (diameter)] from an image shot by SEM, and then calculating an average value of 10 particles. Further, as nonconductive particles, porosity particles may be used.

Content of the nonconductive particle in the porous membrane is preferably 5 wt % to 99 wt %, more preferably 50 wt % to 98 wt %. By making the content of the nonconductive particle in the porous membrane within the above range, it is possible to obtain a porous membrane showing high thermal stability and strength.

(A Binder for Porous Membrane)

A binder for porous membrane used in the present invention, is a polymer particle having a hetero phase structure, in which internal layer is a polymer wherein vinyl monomer components are polymerized and outer layer is a polymer wherein monomer components having a hydrophilic functional group are polymerized.

A binder for porous membrane used in the present invention is composed of polymer particles wherein phases of 2 or more polymers, each having a different chemical structure, form a hetero phase structure. In the present invention, "hetero phase structure" defines particles formed by different phase structure wherein phases of 2 or more polymers, each having a different chemical structure, do not have a single uniform phase but is composed of 2 or more phases different from each other.

In the present invention, a binder for porous membrane has a hetero phase structure, thus, dispersibility and particle size characteristic of the below-mentioned slurry for a porous membrane can be improved, viscosity change of the slurry can be reduced, and that a thin membrane can be uniformly coated with the slurry. As a result, adhesion can be improved while efficiently keeping porosity, and that it has a beneficial effect on preventing break of the porous membrane.

Hetero phase structure of the polymer particle used in the present invention comprises two phases, i.e. internal layer and outer layer of particles, in which the internal layer of a particle is constituted from a polymer wherein vinyl monomer components are polymerized and outer layer of a particle is constituted from a polymer wherein monomer components having a hydrophilic functional group are polymerized.

2 or more polymers constituting polymer particles preferably comprise 2 kinds of polymers having different glass-transition temperatures (hereinafter referred to as "Tg"). In the present invention, considering that a glass-transition temperature of polymer particles can give flexibility to a porous membrane at room temperature and can reduce cracks when taking up a roll or winding, chip in the porous membrane layer, etc., it is preferable that the glass-transition of polymer forming internal layer of particles is −60° C. or more to 20° C. or less while that of polymer forming outer layer of particles is 0° C. or more, and it is more preferable that the glass-transition of polymer forming internal layer of particles is −50° C. or more to 10° C. or less while that of polymer forming outer layer of particles is 0° C. or more to 50° C. or less. The glass-transition temperature of the polymer particles can be fixed by changing ratio of constituting monomers.

A binder for porous membrane of the present invention has an internal layer comprising a polymer wherein vinyl monomer components are polymerized.

As the monomer constituting vinyl monomer component, aliphatic vinyl monomer, (meth)acrylic acid ester monomer, amide group-containing (meth)acrylic monomer, multifunctional di(meth)acrylic monomer, aromatic vinyl monomer, etc. can be exemplified. In the present invention, acrylic acid and methacrylic acid may be described as "(meth)acrylic acid", acrylic and methacrylic may be described as "(meth)acrylic", acrylonitrile and methacrylonitrile may be described as "(meth)acrylonitrile", allyl and methallyl may be described as "(meth)allyl", and acrylyl and methacrylyl may be described as "(meth)acrylyl".

As the aliphatic vinyl monomer, (meth)acrylic acid ester monomer, amide group-containing (meth)acrylic monomer, multifunctional di(meth)acrylic monomer, acrylonitrile, methacrylonitrile, ethylene, propylene, vinyl acetate, ethyl vinyl ether, butyl vinyl ether, etc. are exemplified.

As the (meth)acrylic acid ester monomer, acrylic acid ester or methacrylic acid ester, in which carbon number of alkyl group bonded to a non-carbonyl group oxygen atom is 1 to 5, are exemplified. In concrete, acrylic acid esters, such as methyl acrylate, ethyl acrylate, n-propyl acrylate, isopropyl acrylate, n-butyl acrylate, tert-butyl acrylate and pentyl acrylate; and methacrylic acid esters, such as methyl methacrylate, ethyl methacrylate, n-propyl methacrylate, isopropyl methacrylate, n-butyl methacrylate, tert-butyl methacrylate and pentyl methacrylate, are exemplified.

As the amide group-containing (meth)acrylic monomer, acrylamide, methacrylamide and N-methylol(meth)acrylamide are exemplified.

As the multifunctional di(meth)acrylic monomer, ethylene glycol diacrylate, propylene glycol diacrylate, ethylene glycol dimethacrylate, and propylene glycol dimethacrylate, etc. are exemplified.

As the aromatic vinyl monomer, styrene, α-methyl styrene, divinylbenzene, etc. are exemplified.

In the present invention, as the vinyl component in polymer constituting the internal layer, an aliphatic vinyl monomer is preferable, further, (meth)acrylic acid ester monomer and acrylonitrile are more preferable. Further, when (meth)acrylic acid ester monomer is used for the vinyl component, ethyl acrylate and n-butyl acrylate are preferable. The aliphatic vinyl monomer may be used alone or in combination.

Content ratio of vinyl monomer component in polymer, constituting internal layer, is 80 wt % or more, preferably 90 wt % or more, more preferably 95 wt % or more, and particularly preferably 100 wt % or more, with respect to the entire monomer unit. When content ratio of vinyl monomer component in polymer, constituting internal layer, is in the above range, break is difficult to occur.

A polymer constituting the internal layer may include copolymerizable monomer unit, in addition to the vinyl monomer component. As the copolymerizable monomer, monomer of conjugated dienes and monomer of unconjugated dienes, etc. are exemplified. As the conjugated diene monomer, 1,3-butadiene, chloroprene, piperylene, etc. are exemplified. As the unconjugated diene monomer, 1,2-butadiene, 1,4-pentadiene, dicyclopentadiene, norbornene, ethylidenenorbornene, hexadiene, norbornadiene, etc. are exemplified.

Content ratio of any, except vinyl monomer component in polymer constituting internal layer, is 20 wt % or less, preferably 10 wt % or less, more preferably 5 wt % or less, particularly preferably 0 wt %, with respect to the entire monomer unit.

These monomers may be used alone or in combination of two or more kinds.

A binder for porous membrane of the present invention comprises a polymer, wherein monomer component containing hydrophilic functional group are polymerized, as an outer layer. As the monomer component containing hydrophilic functional group, monomer component having at least one hydrophilic functional group selected from the group consisting —OH group (hydroxyl group), —COOH group (carboxyl group), —$SO_3H$ group (sulfonic acid group), epoxy group, —$PO_3H_2$ group, —PO(OH)(OR) group (R is hydrocarbon group) and lower polyoxyalkylene group, can be exemplified. As the hydrophilic functional group, among these, one selected from a group consisting of sulfonic acid group, carboxyl group, hydroxyl group and epoxy group is preferable, one selected from a group consisting of sulfonic acid group and epoxy group is more preferable, and sulfonic acid group is particularly preferable. When a polymer, wherein monomer components comprising sulfonic acid group are polymerized, is used for the outer layer, dispersing stability of nonconductive particle become superior, and as a result, uniform thin membrane coating of a porous membrane layer is possible and is superior in a rate characteristic.

Existence of hydrophilic functional group in the outer layer, namely, existence of hydrophilic functional group adjacent to particle surface, is likely to interact with the surface of nonconductive particle, which has a beneficial effect on dispersing stabilization of nonconductive particle.

As the monomer containing hydroxyl group, there may be mentioned ethylene unsaturated alcohol such as (meth)allyl alcohol, 3-butene-1-ol and 5-hexene-1-ol; alkanol ester of ethylene unsaturated carboxylic acid such as acrylic acid-2-hydroxy ethyl, acrylic acid-2-hydroxy propyl, methacrylic acid-2-hydroxy ethyl, methacrylic acid-2-hydroxy propyl, maleic acid di-2-hydroxy ethyl, maleic acid di-4-hydroxy butyl and itaconic acid di-2-hydroxy propyl; esters of polyalkylene glycol, expressed by a general formula of $CH_2=CR^1$—COO—$(CnH_{2n}O)_m$—H (m is an integer of 2 to 9, n is an integer of 2 to 4, and R1 is hydrogen or methyl group), and (meth) acrylic acid; mono(meth)acrylic acid esters of dihydroxy ester of dicarboxylic acid such as 2-hydroxyethyl-2'-(meth)acryloyl oxyphthalate and 2-hydroxy ethyl-2'-(meth)acryloyl oxysuccinate; vinyl ethers such as 2-hydroxy ethyl vinyl ether and 2-hydroxy propyl vinyl ether; mono(meth)allyl ethers of alkylene glycol such as (meth) allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth) allyl-4-hydroxybutyl ether and (meth)allyl-6-hydroxyhexyl ether; polyoxyalkylene glycol mono(meth)allyl ethers such as ethylene glycol mono(meth)allyl ether and dipropylene glycol mono(meth)allyl ether; mono(meth)allyl ether of halogen substitute and hydroxy substitute of (poly)alkylene glycol such as glycerin mono(meth)allyl ether, (meth)allyl-2-chloro-3-hydroxy propyl ether and (meth)allyl 2-hydroxy-3-chloropropyl ether; mono(meth)allyl ether of polyhydric phenol such as eugenol and isoeugenol and halogen substitute thereof; (meth)allyl thioethers of alkylene glycol such as (meth allyl-2-hydroxy ethyl thioether and (meth)allyl-2-hydroxypropyl thioether; etc.

As the monomer containing carboxyl group, there may be mentioned monocarbonic acid and derivatives thereof, dicarboxylic acid and derivatives thereof, etc. As the monocarbonic acid, there may be mentioned acrylic acid, methacrylic acid, and crotonic acid, etc. As the monocarbonic acid derivatives, there may be mentioned 2-ethyl acrylic acid, 2-ethyl methacrylic acid, isocrotonic acid, α-acetoxy acrylic acid, β-trans-allyl oxyacrylic acid, α-chloro-β-E-methoxyacrylic acid, β-diamino acrylic acid, etc. As the dicarboxylic acid, there may be mentioned maleic acid, fumaric acid, itaconic acid, etc. As the dicarboxylic acid derivatives, there may be mentioned maleic acid ester such as maleic acid methyl allyl, such as methylmaleic acid, dimethylmaleic acid, phenylmaleic acid, chloromaleic acid, dichloromaleic acid, fluoromaleic acid, maleic acid methylallyl, maleic acid diphenyl, maleic acid nonyl, maleic acid decyl, maleic acid dodecyl, maleic acid octadecyl and maleic acid fluoroalkyl.

A carboxylic acid group generating monomer by hydrolysis of such as dicarboxylic acid anhydride, including maleic acid anhydride, acrylic acid anhydride, methylmaleic acid anhydride, dimethyl maleic acid anhydride, etc., can also be used.

As the monomer containing sulfonic acid group, there may be mentioned vinyl sulfonic acid, methyl vinyl sulfonic acid, (meth)allyl sulfonic acid, styrene sulfonic acid, (meth)acrylic acid-2-sulfonic acid ethyl, 2-acrylamide-2-methyl propane sulfonic acid, 3-allyloxy-2-hydroxypropane sulfonic acid, etc.

As the monomer containing epoxy group, there may be mentioned a monomer containing carbon-carbon double bond and epoxy group and a monomer containing halogen atom and epoxy group.

As the monomer containing carbon-carbon double bond and epoxy group, there may be mentioned unsaturated glycidyl ethers such as vinyl glycidyl ether, allyl glycidyl ether, butenyl glycidyl ether, o-allyl phenyl glycidyl ether, etc.; monoepoxide of dienes or polyenes such as butadiene monoepoxide, chloroprene monoepoxide, 4,5-epoxy-2-pentene, 3,4-epoxy-1-vinyl cyclohexene, 1,2-epoxy-5,9-cyclododecadiene, etc.; alkenyl epoxides such as 3,4-epoxy-1-butene, 1,2-epoxy-5-hexene, 1,2-epoxy-9-decene, etc.; glycidyl esters of unsaturated carboxylic acid such as glycidyl acrylate, glycidyl methacrylate, glycidylcrotonate, glycidyl-4-heptenoate, glycidylsorbate, glycidyl linolate, glycidyl-4-methyl-3-pentenoate, glycidylester of 3-cyclohexene carboxylic acid, glycidylester of 4-methyl-3-cyclohexene carboxylic acid.

As a monomer containing —$PO_3H_2$ group and/or —PO (OH)(OR) group ("R" is a hydrocarbon group), there may be mentioned phosphate-2-(meth)acrylyl oxyethyl, phosphate methyl-2-(meth)acrylyl oxyethyl, phosphate ethyl(meth) acrylyl oxyethyl, etc.

As a monomer containing lower polyoxy alkylene group, there may be mentioned poly(alkylene oxide) such as poly (ethylene oxide).

Content ratio of polymerization unit of a monomer, containing hydrophilic functional group in polymer constituting outer layer, defined as the amount of monomer containing said hydrophilic functional group when polymerizing, is preferably within a range of 0.5 to 40 wt %, more preferably 2 to 20 wt %, with respect to a total amount of 100 wt % monomers.

When content ratio of polymerization unit of monomer, containing hydrophilic functional group, in polymer constituting outer layer is within the above range, it suitably interact with surface of nonconductive particle, which has a beneficial effect on dispersing stabilization of nonconductive particle.

Content of monomer containing hydrophilic functional group in polymer constituting outer layer can be controlled by compositional ratio of monomers when manufacturing polymer.

In the present invention, polymer constituting outer layer, in addition to polymerization unit of monomer containing hydrophilic functional group, preferably further include polymerization unit of (meth)acrylonitrile and that of (meth)acrylic acid esters When polymer constituting outer layer further includes polymerization unit of (meth)acrylonitrile and that of (meth)acrylic acid ester, it has a beneficial effect on a balance of overall characteristics, e.g. dispersibility of a porous membrane slurry, viscosity change, flexibility of a porous membrane, dispersing stabilization of nonconductive particle, etc.

As (meth)acrylonitrile, there may be mentioned acrylonitrile and methacrylonitrile. In particular, acrylonitrile is preferable. Content ratio of polymerization unit of (meth)acrylonitrile, defined as the amount of acrylonitrile when polymerizing, is preferably within a range of 3 to 30 wt %, with respect to a total amount of 100 wt % monomers. When content ratio of polymerization unit of (meth)acrylonitrile is within the above range, motility of polymer is suitably maintained, which has a beneficial effect on dispersing stabilization of nonconductive particle and flexibility of a porous membrane.

As (meth)acrylic acid esters, there may be mentioned acrylic acid ester or methacrylic acid ester, wherein carbon number of alkyl group bonded to non-carbonyl group oxygen atom is 1 to 5. In concrete, acrylic acid esters such as methyl acrylate, ethyl acrylate, n-propyl acrylate, isopropyl acrylate, n-butyl acrylate, tert-butyl acrylate and pentyl acrylate and methacrylic acid esters such as methyl methacrylate, ethyl methacrylate, n-propyl methacrylate, isopropyl methacrylate, n-butyl methacrylate, tert-butyl methacrylate and pentyl methacrylate can be exemplified. In particular, ethyl acrylate and n-butyl acrylate are preferable. Content ratio of polymerization unit of (meth) acrylic acid esters, defined as the amount of (meth)acrylic acid esters when polymerizing, is preferably within a range of 70 to 95 wt %, with respect to a total amount of 100 wt % monomers. When content ratio of polymerization unit of (meth)acrylic acid esters is within the above range, motility of polymer is suitably maintained, which has a beneficial effect on dispersing stabilization of nonconductive particle and flexibility of a porous membrane.

Polymer constituting outer layer may include monomer component containing hydrophilic functional group, (meth)acrylonitrile, (meth)acrylic acid esters, and further, polymerization unit of copolymerizable monomer thereof. As said copolymerizable monomer, the copolymerizable monomer exemplified in the internal layer may be used. Content ratio not involving monomer component containing hydrophilic functional group, polymerization unit of (meth)acrylonitrile and polymerization unit of (meth)acrylic acid esters is preferably 0 to 10 wt %, more preferably 0 to 5 wt % with respect to total polymerization unit. These monomers may be used alone or in combination of two or more kinds.

Polymerization method of a binder for porous membrane of the present invention is not particularly limited; and usual polymerization method, e.g. double-step polymerization such as emulsion polymerization method, suspension polymerization method, dispersion polymerization method, seed polymerization method, etc. can be used. Concrete examples of manufacturing method for composite polymer particle having a hetero phase structure used in the present invention are as follows. A method wherein monomer component corresponding to polymer constituting internal layer is polymerized with a normal method so that polymerization conversion rate become 20 to 100%, preferably 40 to 100%, more preferably 80 to 100%, continuously, monomer component corresponding to polymer constituting outer layer is added and polymerized with a normal method (double-step polymerization method), a method wherein obtaining composite polymer particle by agitating and mixing 2 kinds or more of latex polymer particle, which are separately synthesized, at room temperature to 300° C., preferably 50 to 200° C. for 2 to 100 hours, preferably 4 to 50 hours, etc. can be exemplified.

In these polymerization methods, the used dispersant may be those used in the conventional latex production, and the specific examples include benzene sulfonate such as dodecyl benzene sodium sulfonate and dodecyl phenyl ether sodium sulfonate; alkyl sulfate such as sodium lauryl sulfate and sodium tetradodecyl sulfate; sulfosuccinate such as sodium dioctyl sulfosuccinate and sodium dihexyl sulfosuccinate; fatty acid salt such as sodium laurate; ethoxysulfate such as polyoxy ethylene lauryl ether sodium sulfate and polyoxy ethylene nonyl phenyl ether sodium sulfate; alkane sulfonate; alkyl ether sodium phosphate; non-ionic emulsifier such as polyoxy ethylene nonyl phenyl ether, polyoxy ethylene sorbitan lauryl ester and polyoxy ethylene polyoxy propylene block copolymer; water-soluble polymer such as gelatin, maleic acid anhydride-styrene copolymer, polyvinyl pyrrolidone, sodium polyacrylic acid and polyvinyl alcohol having polymerization degree of 700 or more and saponification degree of 75% or more. These dispersants may be used alone or in combination of two or more. The amount of the dispersant can be arbitrarily set, and is normally 0.01 to 10 parts by weight or so with respect to 100 parts by weight of the total amount of the monomers. Dispersants may not be used according to the polymerization conditions.

Among these, benzene sulfonate such as dodecyl benzene sodium sulfonate and dodecyl phenyl ether sodium sulfonate, alkyl sulfate such as sodium lauryl sulfate and sodium tetradodecyl sulfate are preferable, and in view of its excellent oxidation resistance, benzene sulfonate dodecyl benzene sulfonic acid sodium and dodecyl phenyl ether sodium sulfonate are further preferable.

As the polymerization initiator, it may be used in usual emulsion polymerization, dispersion polymerization, suspension polymerization, seed polymerization, etc., and for instance, persulfates such as potassium persulfate and ammonium persulfate; hydrogen peroxide; and organic peroxide such as benzoyl peroxide and cumene hydroperoxide, etc. may be used. They may be used alone or may be a redox based polymerization initiator, which is a combined form with reducing agent, such as acid sodium sulfite, sodium subsulfite, ascorbic acid, etc. Further, azo compounds, such as 2,2'-azobisisobutyronitrile, 2,2'-azobis(2,4-dimethyl valeronitrile), 2,2'-azobis(4-methoxy-2,4-dimethyl valeronitril), dimethyl-2,2'-azobis isobutyrate and 4,4'-azobis(4-cyanopentanoic acid), amidine compounds, such as 2,2'-azobis(2-aminodipropane)dihydrochloride, 2,2'-azobis(N,N'-dimethyleneisobutylamidine), 2,2'-azobis(N,N'-dimethyleneisobutylamidine)dihydrochloride, etc. may be used. These may be used alone or in combination of two or more. The amount of the polymerization initiator is normally 0.01 to 10 parts by weight, preferably 0.1 to 5 parts by weight, with respect to 100 parts by weight of the total amount of the monomers.

Although polymerization temperature and polymerization time can be selected according to the polymerization method or a kind of the used polymerization inhibitor, normally, the polymerization temperature is approximately 50 to 200° C. and the polymerization time is approximately 0.5 to 20 hours. Further, combination use of conventionally known additives, such as amine for polymerization aid, may be performed during polymerization.

A binder for porous membrane used in the invention is preferably obtained through a particulate metal removing process, wherein particulate metals included in polymer dispersion are removed, in manufacturing process of polymer. When content of particulate metal component included in polymer dispersion is 10 ppm or less, it is possible to prevent metal ionic cross-linkage between polymers in the after-mentioned slurry for a porous membrane over time, and to prevent increase in viscosity. Furthermore, it may result in decreasing concern to grow self-discharge due to internal short circuit of the secondary battery, or melt and precipitation in case of charge to improve cycle characteristic and safety of the battery.

A method for removing particulate metal components from the polymer dispersion liquid in the above particulate metal removing process is not particularly limited, and may include, for example, a removing method by filtration using a filter, a removing method by a vibrating screen, a removing method by centrifugation, a removing method by magnetic force, etc. Among these, the removing method by magnetic force is preferable because metal components are intended for removal. The removing method by magnetic force is not particularly limited as far as the method allows removing metal components, and in view of productivity and removal efficiency, the removing process can preferably be done by arranging a magnetic filter during the manufacturing line of the polymer.

Content ratio of the binder for porous membrane in a porous membrane is preferably 0.1 to 10 wt %, more preferably 0.5 to 5 wt %, and particularly preferably 0.5 to 3 wt %. When content ratio of the binder for porous membrane in a porous membrane is within the above range, binding property between nonconductive particles and binding property to an electrode or separator can be maintained, while inhibiting the movement of lithium and preventing increase in resistance.

Ratio of internal layer and outer layer in polymer particle, in order to obtain high rate characteristic while controlling degree of swelling to electrolyte solution with in a predetermined range, varies according to its composition and degree of cross-linkage. The ratio of outer layer:internal layer by weight is 1090 to 90:10 and more preferably 30:70 to 70:30. When the ratio of outer layer and internal layer are within the above range, it has a beneficial effect on total characteristics, such as dispersibility and viscosity change of a porous membrane slurry, flexibility of a porous membrane, etc.

Although a range of weight-average molecular weight of the polymer particles varies according to its structure, degree of cross-linkage, etc., a standard polystyrene equivalent value measured by gel permeation chromatograph using tetrahydrofuran (THF) as a developing solvent is 10,000 to 1,500,000, more preferably 50,000 to 1,000,000. When weight-average molecular weight of polymer particles is within the above-range, adsorption stability of nonconductive particle to polymer particle is high, cross-linkage agglutination by polymer particle does not occur, and show superior dispersibility.

Although formation of polymer particle of the present invention may be spherical form, hetero form or indeterminate form, and is not particularly limited, number average particle diameter is normally 0.01 to 2 μm, preferably 0.03 to 1 μm, and more preferably 0.05 to 0.5 μm. When particle diameter of polymer particle is too large, it becomes difficult to contact with nonconductive particle when used as a binder for porous membrane, thus binding property decreases. Conversely, when particle diameter of polymer particle is too small, amount of binder necessary to maintain binding property becomes too much. Note that "particle diameter" described here is a value calculated as an average value by measuring major and minor axes of 100 polymer particles by transmission electron micrograph The porous membrane may further include other components such as dispersant, leveling agent, antioxidizing agent, binder not involving the above polymer particles, thickener, additive for electrolytic solution having functions to inhibit degrading, etc. These are not particularly limited as far as these have little influence to battery reaction.

As the dispersant, there may be exemplified an anionic compound, cationic compound, non-ionic compound and high-molecular compound. The dispersant can be selected depending on the nonconductive particle used. Content ratio of the dispersant in the porous membrane is preferably within the range not to affect the battery properties, and is specifically 10 wt % or less.

As the leveling agent, there may be mentioned surfactants such as alkyl surfactant, silicone-based surfactant, fluorine-based surfactant and metallic surfactant. By mixing the surfactant, it is possible to prevent eye hole caused in coating process, and to improve flatness of the electrode.

As the antioxidizing agent, there may be mentioned phenol compound, hydroquinone compound, organic phosphorus compound, sulfur compound, phenylene diamine compound, polymer-type phenol compound, etc. The polymer-type phenol compound is a polymer having a phenol structure within the molecule, and the polymer-type phenol compound having a weight average molecular weight of 200 to 1000, preferably 600 to 700, is used.

As the binder for porous membrane, in addition to the above polymer particles, polytetrafluoro ethylene (PTFE), polyvinylidene fluoride (PVDF), polyacrylic acid derivatives, polyacrylonitril derivatives, soft polymer and the like used for the after-mentioned binder for electrode material mixture layer can be used.

As the thickener, there may be mentioned cellulose-based polymer, such as carboxymethyl cellulose, methyl cellulose and hydroxy propyl cellulose, and ammonium salt and alkali metal salt thereof; (denatured) poly(meth)acrylic acid, and ammonium salt and alkali metal salt thereof; polyvinyl lalcohols such as (denatured) polyvinyl alcohol, copolymer of acrylic acid or acrylate with vinyl alcohol, copolymer of anhydride maleic acid or maleic acid or fumaric acid with vinyl alcohol; polyethylene glycol, polyethylene oxide, polyvinyl pyrrolidone, denatured polyacrylic acid, oxidized starch, starch phosphate, casein, a variety of denatured starches, hydride of acrylonitril butadiene copolymer, etc. When the amount used of the thickener is within the range, coating property and adhesiveness with the electrode material mixture layer and the organic separator is good. In the present invention, "(denatured) poly" means "native poly" or "denatured poly" and "(meth)acrylic" means "acrylic" or "methacrylic".

For the additive for electrolytic solution, vinylene carbonate used in the after-mentioned electrode material mixture layer slurry and the electrolytic solution can be used. In addition, there may be mentioned nanoparticle such as fumed silica, fumed alumina, etc. By mixing the above nanoparticle, it is possible to control thixotropy of porous membrane forming slurry, and furthermore, it is possible to improve leveling property of the porous membrane obtained by the slurry.

Content ratio of the other components in the porous membrane is preferably within the range not affecting the battery properties, and specifically 10 wt % or less for each component and 20 wt % or less for the total content ratio of the other components.

(Method for Manufacturing Porous Membrane)

As a method for manufacturing the porous membrane of the present invention, there may be mentioned 1) a method in which the slurry for porous membrane including nonconductive particle, a binder for porous membrane and a solvent is applied to a predetermined base material, followed by drying; 2) a method in which a base material is immersed in the slurry for porous membrane including nonconductive particle, a binder for porous membrane and a solvent, followed by drying; and 3) the slurry for porous membrane including nonconductive particle, a binder for porous membrane and a solvent is applied onto a release film, followed by drying, and the obtained porous membrane is transferred to a predetermined base material. Among these, the method 1) in which the slurry for porous membrane including nonconductive particle, a binder for porous membrane and a solvent is applied to a base material, followed by drying is the most preferable because the membrane thickness of the porous membrane can easily be controlled.

The method for manufacturing the porous membrane of the present invention is characterized by applying the above slurry for porous membrane to a base material, followed by drying.

(Porous Membrane Slurry)

The slurry for porous membrane of the present invention comprises nonconductive particle, a binder for porous membrane and a solvent. For the nonconductive particle and the binder for porous membrane, those explained in the above porous membrane are used.

The solvent is not particularly limited as far as the solvent is able to uniformly disperse the above solid contents (the nonconductive particle and the binder for porous membrane and the other components).

As the solvent used for the slurry for porous membrane, either water or organic solvent can be used. The organic solvent may include cyclic aliphatic hydrocarbons such as cyclopentane and cyclohexane; aromatic hydrocarbons such as toluene, xylene and ethyl benzene; ketones such as acetone, ethyl methyl ketone, diisopropyl ketone, cyclohexanone, methyl cyclohexane and ethyl cyclohexane; chlorine-based aliphatic hydrocarbons such as methylene chloride, chloroform and carbon tetrachloride; esters such as ethyl acetate, butyl acetate, γ-butyrolactone and ε-caprolactone; acrylonitriles such as acetonitrile and propionitrile; ethers such as tetrahydrofuran and ethylene glycol diethyl ether; alcohols such as methanol, ethanol, isopropanol, ethylene glycol and ethylene glycol monomethyl ether; amides such as N-methylpyrrolidone and N,N-dimethyl formamide.

These solvents may be used alone or as mixed solvent obtained by mixing two or more solvents. Among these, solvent superior in dispersibility of nonconductive particles and has a low melting point and a high volatility is particularly preferable, because it can be removed in a short-time at a low temperature. In concrete, acetone, toluene, cyclohexanone, cyclopentane, tetrahydrofuran, cyclohexane, xylene, water, N-methylpyrrolidone, and mixed solvent thereof are preferable.

Solid content concentration of the slurry for porous membrane is not particularly limited as far as the slurry shows viscosity being sufficient for apply and immersing and having fluidity, and is generally 10 to 50 wt % or so.

Also, the slurry for porous membrane may further include other components such as dispersant, additive for electrolytic solution having functions to inhibit degradation of electrolytic solution in addition to the nonconductive particle, binder for porous membrane, the above-mentioned other components and the solvent. These are not particularly limited as far as these do not affect battery reaction.

(Method for Preparing Porous Membrane Slurry)

A method for preparing the slurry for porous membrane is not particularly limited, and the slurry can be obtained by mixing the above nonconductive particle, binder for porous membrane and solvent in addition to other components added if appropriate.

In the present invention, the use of the above components can result in obtaining a slurry for porous membrane in which the nonconductive particle is highly dispersed despite a mixing method or mixed order. A mixing machine is not particularly limited as far as it is able to uniformly mix the above components, and ball mill, sand mill, pigment disperser, stone mill, ultrasonic disperser, homogenizer, planetary mixer and the like can be used. Among these, it is particularly preferable to use a high-performance disperser such as bead mill, roll mill and FILMIX, able to add high dispersing share.

Viscosity of the slurry for porous membrane is preferably 10 mPa·s to 10,000 mPa·s, further preferably 50 to 500 mPa·s in view of uniform coating property and stability of the slurry over time. The above viscosity is a value measured at 25° C. with rotation number of 60 rpm using a Type B viscosity meter.

In the method for manufacturing the porous membrane of the present invention, the base material is not particularly limited, but it is preferable to form the porous membrane of the present invention particularly on an electrode or an organic separator for a secondary battery. Among these, it is more preferable to form particularly on an electrode surface for a secondary battery. By forming the porous membrane of the present invention on the electrode surface for a secondary battery, short circuit between the positive electrode and the negative electrode may not be caused and high safety can be maintained even when an organic separator is contracted by heat. In addition, by forming the porous membrane of the present invention on the electrode surface for a secondary battery, the porous membrane can work as a separator even without the organic separator, so that it is possible to produce a battery at low cost. Also, even when the organic separator is used, it is possible to show higher rate characteristic without filling in pores formed on the surface of the organic separator.

In the method for manufacturing the porous membrane of the present invention, the membrane may be formed on a base material other than the electrode and organic separator. In case that the porous membrane of the present invention is formed on a base material other than the electrode and organic separator, the porous membrane can be used by stacking on the electrode or the organic separator when removing from the base material to directly assembly a battery.

A method for coating the slurry for porous membrane on the base material is not particularly limited. For example, there may be mentioned doctor blade method, dip method, reverse roll method, direct roll method, gravure method, extrusion method, brush method, etc. Among these, dip method and gravure method are preferable because the uniform porous membrane can be obtained.

A drying method may include, for example, drying by warm air, hot air or low wet air, vacuum drying, drying method with irradiation of (far-)infrared rays, electron beam and the like. The drying temperature can be varied depending on the kind of the solvent used. In order to completely remove the solvent, it is preferable to dry at high temperature of 120° C. or more using a blast drying machine when a low-volatile solvent such as N-methylpyrrolidone, for example. In contrast, it is possible to dry at low temperature of 100° C. or less when a highly-volatile solvent is used. When the porous membrane is formed on the after-mentioned organic separator, it is necessary to dry without causing contraction of the organic separator, drying at low temperature of 100° C. or less is preferable.

Then, if necessary, it is possible to improve adhesiveness between the electrode material mixture layer and the porous membrane through pressure treatment by using mold press, roll press and the like. However, it is required to properly control pressure and pressure applying time because excessive pressure treatment may cause to reduce void ratio of the porous membrane.

The thickness of the porous membrane is not particularly limited, and is properly determined depending on intended purpose or applied area of the porous membrane. When it is too thin, uniform membrane cannot be formed; and when it is too thick on the other hand, capacity per volume (weight) in the battery is decreased, so that 0.5 to 50 μm is preferable, and 0.5 to 10 μm is more preferable.

The porous membrane of the present invention is formed on the surface of the electrode material mixture layer of the electrode for a secondary battery or the organic separator, and is particularly preferably used as a protective membrane for the electrode material mixture layer or as a separator. The electrode for a secondary battery where the porous membrane is formed is not particularly limited, and it is possible to form the porous membrane of the present invention onto any electrode varied in constitution. Also, the porous membrane may be formed on either surface of the positive electrode or the negative electrode of the secondary battery, and may be formed on both positive electrode and negative electrode.

A porous membrane of the present invention, in which nonconductive particles are bonded by a porous membrane binder, has a structure wherein voids are formed between nonconductive particles. An electrolyte solution is possible to osmose in these voids, thus a battery reaction cannot be prevented.

(Electrode for Secondary Battery)

The electrode for a secondary battery of the present invention can be obtained by adhering the electrode material mixture layer including binder for an electrode material mixture layer and electrode active material to a collector, and having the above porous membrane on the surface of the electrode material mixture layer.

(Electrode Active Material)

The electrode active material used for the electrode for a secondary battery of the present invention may be selected depending on the secondary battery where the electrode is used. The above secondary battery may include a lithium-ion secondary battery and a nickel hydrogen secondary battery.

When the electrode for a secondary battery of the present invention is used as a positive electrode of a lithium-ion secondary battery, an electrode active material (positive electrode active material) for a positive electrode of the lithium-ion secondary battery can be classified into those composed of an inorganic compound and those composed of an organic compound.

As the positive electrode active material composed of an inorganic compound, there may be mentioned transition metal oxide, composite oxide of lithium and transition metal, transition metal sulfide, etc. As the above transition metal, Fe, Co, Ni, Mn and the like can be used. Specific examples of the inorganic compound used for the positive electrode active material may include lithium-containing composite metal oxide such as $LiCoO_2$, $LiNiO_2$, $LiMnO_2$, $LiMn_2O_4$, $LiFePO_4$ and $LiFeVO_4$; transition metal sulfide such as $TiS_2$, $TiS_3$ and amorphous $MoS_2$; and transition metal oxide such as $Cu_2V_2O_3$, amorphous $V_2O$—$P_2O_5$, $MoO_3$, $V_2O_5$ and $V_6O_{13}$. These compounds may partially be subject to elemental substitution. As the positive electrode active material composed of an organic compound, for example, conductive high molecular can be used, such as polyacetylene and poly-p-phenylene. Iron-based oxide having poor electrical conductivity may be used as an electrode active material covered by carbon material by performing reduction firing under the presence of carbon source. Also, these compounds may partially be subject to elemental substitution.

The positive electrode active material for a lithium-ion secondary battery may be mixture of the above inorganic compound and organic compound. The particle diameter of the positive electrode active material can properly be selected in view of other constitutional requirements of the battery, and 50% volume cumulative diameter is normally 0.1 to 50 μm, preferably 1 to 20 μm, in view of improvements in battery properties such as rate characteristics and cycle characteristics. When the 50% volume cumulative diameter is within the range, it is possible to obtain a secondary battery having large discharge and charge capacity, and also, it can be easy to handle when producing electrode slurry and electrode. The 50% volume cumulative diameter can be obtained by measuring particle size distribution with laser diffraction.

When the electrode for a secondary battery of the present invention is used for a negative electrode of a lithium-ion secondary battery, there may be mentioned, for example, carbonaceous material such as amorphous carbon, graphite, natural graphite, mesocarbon microbead and carbon pitch fiber, conductive high-molecular such as polyacene as an electrode active material for a negative electrode of a lithium-ion secondary battery (negative electrode active material). Also, silicone, metal such as tin, zinc, manganese, iron and nickel, and alloys thereof, oxide and sulfate of the above metal or alloy can be used as the negative electrode active material. In addition, lithium alloy such as metal lithium, Li—Al, Li—Bi—Cd and Li—Sn—Cd, lithium transition metal nitride, silicone and the like can be used. The electrode active material in which a conductivity providing agent is adhered onto its surface by mechanical reforming method can be used as well. The particle diameter of the negative electrode active material can properly be selected in view of other requirements of the battery, and 50% volume cumulative diameter is normally 1 to 50 μm, preferably 15 to 30 μm, in view of improvements in battery properties such as primary efficiency, output characteristics and cycle characteristics.

When the electrode for a secondary battery of the present invention is used for a positive electrode of a nickel hydrogen secondary battery, there may be mentioned hydroxide nickel particle as an electrode active material for a positive electrode of a nickel hydrogen secondary battery (positive electrode active material). The hydroxide nickel particle may be solid-solution with cobalt, zinc, cadmium and the like, or alternatively, its surface may be coated by a cobalt compound thermally treated by alkaline. Also, the hydroxide nickel particle may include an additive including cobalt compound such as cobalt oxide, metal cobalt and cobalt hydroxide, zinc compound such as metal zinc, zinc oxide and zinc hydroxide, rare-earth compound such as erbium oxide in addition to yttrium oxide.

When the electrode for a secondary battery of the present invention is used for a negative electrode of a nickel hydrogen secondary battery, a hydrogen storing alloy particle can be an electrode active material (negative electrode active material). The hydrogen storing alloy particle may be any of those able to store hydrogen electrochemically generated in an alkaline electrolytic solution in case of battery charge and to easily release the stored hydrogen at the time of discharge and is not particularly limited, but is preferably particle of AB5 type, TiNi-based and TiFe-based hydrogen storing alloy. Specifically, for example, $LaNi_5$, $MmNi_5$ (Mm indicates misch metal), $LmNi_5$ (Lm indicates at least one selected from rare-earth elements including La) and multielement hydrogen storing alloy particle obtained by substituting a part of Ni in alloy thereof with one or more elements selected from Al, Mn, Co, Ti, Cu, Zn, Zr, Cr and B can be used. The hydrogen storing alloy particle having a composition expressed by a general formula: $LmNi_wCo_xMn_yAl_z$ (the total of atom ratios w, x, y and z is in the following range: $4.80 \leq w+x+y+z \leq 5.40$) is particularly preferable because of improvement in discharge and charge cycle life by inhibiting particle size reduction with progression of discharge and charge cycle.

(Binder for Electrode Material Mixture Layer)

In the present invention, the electrode material mixture layer includes binder for an electrode material mixture layer in addition to the electrode active material. By including the binder for electrode material mixture layer, binding property of the electrode material mixture layer in the electrode can be improved, strength to mechanical force applied during winding process of the electrode and the like can be increased, and also, risks of short circuit and the like caused by such removed layer can be reduced because the electrode material mixture layer in the electrode is hardly removable.

Various resin components can be used as the binder for an electrode material mixture layer. For example, it is possible to use polyethylene, polytetrafluoro ethylene (PTFE), polyvinylidene fluoride (PVDF), tetrafluoroethylene hexafluoropropylene copolymer (FEP), polyacrylic acid derivatives, polyacrylonitril derivatives, etc. These may be used alone or in combination of two or more.

Further, the following examples of soft polymers can be used as the binder for an electrode material mixture layer.

There may be mentioned acrylic soft polymer which is a homopolymer of acrylic acid or methacrylic acid derivative, or a copolymer of monomer copolymerizable therewith such as polybutyl acrylate, polybutyl methacrylate, polyhydroxyethyl methacrylate, polyacrylic amide, polyacrylonitril, butyl acrylate-styrene copolymer, butyl acrylate-acrylonitril copolymer and butyl acrylate-acrylonitril-glycidyl methacrylate copolymer;

isobutylene-based soft polymer such as polyisobutylene, isobutylene-isoprene rubber and isobutylene-styrene copolymer;

diene-based soft polymer such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene-block copolymer, isoprene-styrene-block copolymer and styrene-isoprene-styrene-block copolymer;

silicone containing soft polymer such as dimethyl polysiloxane, diphenyl polysiloxane and dihydroxy polysiloxane;

olefin-based soft polymer such as liquid polyethylene, polypropylene, poly-1-butene, ethylene-α-olefin copolymer, propylene-α-olefin copolymer, ethylene-propylene-diene copolymer (EPDM) and ethylene-propylene-styrene copolymer;

vinyl-based soft polymer such as polyvinyl alcohol, polyvinyl acetate, poly vinyl stearate and vinyl acetate-styrene copolymer;

epoxide-based soft polymer such as polyethylene oxide, polypropylene oxide and epichlorohydrin rubber;

fluorine containing soft polymer such as vinylidene fluoride rubber and ethylene propylene tetrafluoride rubber; and other soft polymers including natural rubber, polypeptide, protein, polyester-based thermoplastic elastomer, vinyl chloride-based thermoplastic elastomer and polyamide-based thermoplastic elastomer. These soft polymers may have a cross-linked structure, and also, a functional group may be introduced therein by denaturalization.

Amount of the binder for an electrode material mixture layer in the electrode material mixture layer is preferably 0.1 to 5 parts by weight, more preferably 0.2 to 4 parts by weight, particularly preferably 0.5 to 3 parts by weight, per 100 parts by weight of the electrode active material. When the amount of the binder for an electrode material mixture layer is in the above range, it is possible to prevent an active material from dropping from the electrode without inhibiting battery reaction.

The binder for an electrode material mixture layer can be prepared as a solution or dispersion liquid for producing an electrode. The viscosity is normally within the range of 1 mPa·s to 300,000 mPa·s, preferably 50 mPa·s to 10,000 mPa·s. The above viscosity can be obtained by measuring at 25° C. with rotation number of 60 rpm using a Type B viscosity meter.

In the present invention, the electrode material mixture layer may include a conductivity providing agent and reinforcing material. The conductivity providing agent may include conductive carbon such as acetylene black, Ketjen black, carbon black, graphite, vapor-phase carbon fiber and carbon nanotube. There may also be carbon powder such as black lead, fiber and foil of a variety of metals, etc. As the reinforcing material, a variety of inorganic and organic spherical, plate-like, rod-like or fibrous form filler can be used. By using a conductivity providing agent, it is possible to improve electrical interengagement between electrode active materials, and particularly when it is used in a lithium-ion secondary battery, discharge power can be improved. Amounts of the conductivity providing agent and reinforcing material are normally 0 to 20 parts by weight, preferably 1 to 10 parts by weight, per 100 parts by weight of the electrode active material.

The electrode material mixture layer can be formed by adhering a slurry including the binder for an electrode material mixture layer, the electrode active material and the solvent (hereinafter may also be referred to as "electrode material mixture layer forming slurry") to the collector.

The solvent may be any able to melt or disperse to particulate the above binder for an electrode material mixture layer, and is preferably those able to melt. When using the solvent able to melt the binder for an electrode material mixture layer, dispersion of the electrode active material and the like can be stabilized by adsorbing the binder for an electrode material mixture layer on the surface thereof.

As the solvent for the electrode material mixture layer forming slurry, either water or organic solvent can be used. The organic solvent may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, β-butyrolactone and ε-caprolactone; nitriles such as acetonitrile and propionitrile; ethers such as tetrahydrofuran and ethylene glycol diethyl ether; alcohols such as methanol, ethanol, isopropanol, ethylene glycol and ethylene glycol monomethyl ether; amides such as N-methylpyrrolidone and N,N-dimethyl formamide. These solvents may be used alone, or as a mixture of two or more by properly selecting in view of drying rate and environmental aspect.

The electrode material mixture layer forming slurry may include a thickener. A polymer soluble in the solvent used for the electrode material mixture layer forming slurry can be used. As the thickener here, it is possible to use the thickener exemplified in the porous membrane of the present invention. Amount of the thickener is preferably 0.5 to 1.5 parts by weight per 100 parts by weight of the electrode active material. When the amount of the thickener is within the range, coating property and adhesiveness to the collector are good.

The electrode material mixture layer forming slurry further includes trifluoropropylene carbonate, vinylene carbonate, catechol carbonate, 1,6-dioxa spiro[4,4]nonane-2,7-dione, 12-crown-4-ether, etc. in addition to the above components for increasing stability and life of the battery. Also, these may be used by including the same in the after-mentioned electrolytic solution.

Amount of the solvent in the electrode material mixture layer forming slurry can be adjusted to have preferable viscosity at the time of coating depending on the kind of the electrode active material, the binder for an electrode material mixture layer and the like. Specifically, the concentration of the combined solid contents of the electrode active material, the binder for an electrode material mixture layer and other additives such as conductivity providing agent in the electrode material mixture layer forming slurry is adjusted to preferably 30 to 90 wt %, more preferably 40 to 80 wt %.

The electrode material mixture layer forming slurry can be obtained by mixing the electrode active material, the binder for an electrode material mixture layer, the other additive added if necessary such as conductivity providing agent, and the solvent by using a mixing machine. The above respective components may collectively be provided to the mixing machine and mixed. When the electrode active material, the binder for an electrode material mixture layer, the conductivity providing agent and the thickener are used as structural components of the electrode material mixture layer forming slurry, it is preferable to mix the conductivity providing agent and the thickener in the solvent to disperse the conductivity providing agent into microparticle, followed by adding the binder for an electrode material mixture layer and the electrode active material and further mixing, because dispersibility of the obtained slurry can be improved. As the mixing machine, ball mill, sand mill, pigment disperser, stone mill, ultrasonic disperser, homogenizer, planetary mixer, Hobart mixer and the like can be used, and it is preferable to use ball mill because agglutination of the conductivity providing agent and electrode active material can be inhibited.

The particle size of the electrode material mixture layer forming slurry is preferably 35 μm or less, further preferably 25 μm or less. When the particle size of the slurry is within the above range, dispersibility of the conductive material can be high, and a uniform electrode can be obtained.

The collector is not particularly limited as far as it is electrically conductive and electrochemically durable, and for example, metallic material such as iron, copper, aluminum, nickel, stainless steel, titanium, tantalum, gold and platinum are preferable in view of exhibiting heat-resistance. Among these, aluminum is particularly preferable for a positive electrode of a lithium-ion secondary battery, and copper is particularly preferable for a negative electrode of a lithium-ion secondary battery. The shape of the collector is not particularly limited, and is preferably sheet-like having a thickness of 0.001 to 0.5 mm or so. The collector is preferably used after preliminary roughening for increasing adhering strength of the electrode material mixture layer. As a roughening method, there may be mentioned mechanical method of polishing, electropolishing, chemical polishing, etc. In the mechanical method of polishing, coated abrasive with adhering abrasive particles, grinding stone, emery buff, wire-brush provided with steel wire, etc. can be used. Also, for increasing the adhering strength and conductivity of the electrode material mixture layer, an intermediate layer may be formed on the surface of the collector.

A method for producing the electrode material mixture layer may be any method in which the electrode material mixture layer is bound to form layers to at least one surface of the above collector, preferably both surfaces. For example, the electrode material mixture layer can be formed by applying the above electrode material mixture layer forming slurry onto the collector and drying the same, followed by heating treatment at 120° C. or more for 1 hour or more. The method of coating the electrode material mixture layer forming slurry to the collector is not particularly limited. For example, there may be mentioned doctor blade method, dip method, reverse roll method, direct roll method, gravure method, extrusion method, brush method, etc. For the drying method, for example, there may be mentioned drying by warm air, hot air or low wet air, vacuum drying, drying method with irradiation of (far-)infrared rays, electron beam and the like.

Then, it is preferable to lower void ratio of the electrode material mixture layer of the electrode by pressure treatment with mold press, roll press and the like. The preferable range of the void ratio is 5% to 15%, more preferably 7% to 13%. Too high void ratio may cause to deteriorate charge efficiency and discharge efficiency. Too low void ratio may cause problems such that high volume capacity can hardly be obtained, and that the electrode material mixture layer can easily be peeled off to cause defect. Furthermore, when using a curable polymer, it is preferable to cure the polymer.

The thickness of the electrode material mixture layer is normally 5 to 300 μm, preferably 10 to 250 μm, for both positive electrode and negative electrode.

(Separator for Secondary Battery)

The separator for a secondary battery of the present invention comprises the above porous membrane on an organic separator.

As the organic separator, publicly-known separators including polyolefin resin such as polyethylene and polypropylene, aromatic polyamide resin and the like can be used.

For the organic separator used in the present invention, porous membrane which lacks electron conductivity, has ion conductivity, is highly resistant to the organic solvent and has fine pore diameter can be used, and for example, there may be mentioned microporous membrane made of resin such as polyolefin (polyethylene, polypropylene, polybutene, polyvinyl chloride), and mixture or copolymer thereof, microporous made of resin such as polyethylene terephthalate, polycycloolefin, polyethersulfone, polyamide, polyimide, polyimide amide, polyaramid, nylon and polytetrafluoro ethylene, or woven material of polyolefin fiber, or nonwoven cloth, aggregate of insulating particles, etc. Among these, microporous membrane made of polyolefin resin is preferable because coating property of the slurry for porous membrane is good to reduce the thickness of the whole separator, to increase a rate of the active material in the battery and to increase capacity per volume.

The thickness of the organic separator is normally 0.5 to 40 μm, preferably 1 to 30 μm, further preferably 1 to 10 μm. Within the above range, resistance due to the separator can be decreased in the battery, and workability at the time of coating to the organic separator is good.

In the present invention, the polyolefin resin used as a material of the organic separator may include homopolymer and copolymer of polyethylene, polypropylene and the like, mixture thereof, etc. As the polyethylene, there may be mentioned low-density, medium density and high-density polyethylene, and high-density polyethylene is preferable in view of sticking strength and mechanical strength. Also, two or more polyethylene may be mixed for the purpose of giving flexibility. A polymerization catalyst used for the polyethylene is not particularly limited, and may include Ziegler-Natta catalyst, Phillips catalyst, metallocene catalyst, etc. The viscosity average molecular weight of the polyethylene is preferably 100,000 or more to 12,000,000 or less, more preferably 200,000 or more to 3,000,000 or less in view of balancing mechanical strength with high permeability. As the polypropylene, there may be mentioned homopolymer, random copolymer and block copolymer, and these may be used alone, or two or more may be mixed to use. Also, a polymerization catalyst is not particularly limited, and may include Ziegler-Natta catalyst, metallocene catalyst, etc. Also, tacticity is not particularly limited, and isotactic, syndiotactic or atactic polypropylene can be used, but it is desired to use isotactic polypropylene in view of inexpensive price. The polyolefin may further be added with an appropriate amount of polyethylene or polyolefin other than polypropylene, and an additive such as antioxidizing agent and nucleating agent within the range not affecting the effects of the present invention.

As a method for preparing polyolefin-based organic separator, any publicly-known and used can be used, and for example, the following methods can be selected: a dry method in which polypropylene or polyethylene is melted and extruded to form film, followed by annealing at a low temperature to allow crystal domain to grow, and a microporous membrane is formed by stretching the same to stretch amorphous domain; a wet method in which polypropylene or polyethylene is mixed with a hydrocarbon solvent and other low molecular materials, followed by forming film, and then, a microporous membrane is formed by removing the solvent and low molecules from the obtained film where the solvent and low molecules gather around amorphous phase to form an island phase by using another easily volatized solvent; etc. Among these, the dry method is preferable because large void is easily obtained for reducing resistance.

The organic separator used in the present invention may include other filler and fibrous compound for the purpose of controlling strength, hardness and heat contraction rate. Also, when the above porous membrane is layered, the organic separator may preliminarily be coated by low-molecular compound or high-molecular compound, or be subject to treatment by electromagnetic rays such as ultraviolet rays, corona discharge treatment/plasma-treatment by plasma gas for the purpose of improving adhesiveness, and improving impregnation of the electrolytic solution by reducing surface tension. Particularly, it is preferable to coat with high-molecular compound containing a polar group such as carboxylic acid group, hydroxyl group and sulfonic acid group because impregnation of the electrolytic solution is high and adhesiveness with the above porous membrane is easily obtainable.

(Secondary Battery)

A secondary battery of the present invention comprises a positive electrode, a negative electrode, a separator and an electrolytic solution, in which the above porous membrane is layered on at least any of the positive electrode, negative electrode and the separator.

For the secondary battery, a lithium-ion secondary battery, a nickel hydrogen secondary battery and the like may be mentioned, and a lithium-ion secondary battery is preferable because improved safety is most required, an effect to introduce the porous membrane is highest and improvement in output characteristics is a problem to be solved. Hereinafter, the use in a lithium-ion secondary battery will be explained.

(Electrolytic Solution)

As an electrolytic solution for a lithium-ion secondary battery, organic electrolytic solution in which supporting electrolyte is melted in an organic solvent can be used. For the supporting electrolyte, lithium salt can be used. The lithium salt is not particularly limited, and may include $LiPF_6$, $LiAsF_6$, $LiBF_4$, $LiSbF_6$, $LiAlCl_4$, $LiClO_4$, $CF_3SO_3L_1$, $C_4F_9SO_3Li$, $CF_3COOLi$, $(CF_3CO)_2NLi$, $(CF_3SO_2)_2NLi$, $(C_2F_6SO_2)NLi$, etc. Among these, $LiPF_6$, $LiClO_4$ and $CF_3SO_3Li$, easily soluble in a solvent and showing high degree of dissociation, are preferable. Two or more of these may be combined to use. The supporting electrolyte with higher degree of dissociation results in higher lithium-ion conductivity, so that it is possible to adjust lithium-ion conductivity by the kind of the supporting electrolyte.

The organic solvent used in the electrolyte solution for a lithium-ion secondary battery is not particularly limited as far as the solvent is able to melt the supporting electrolyte. Carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate; ethers such as 1,2-dimethoxyethane and tetrahydrofuran; sulfur-containing compounds such as sulfolane and dimethyl sulfoxide are preferably used. Also, the mixture of these solvents may be used. Among these, carbonates are preferable because of high permittivity and broad stable potential range. The solvent having lower viscosity results in higher lithium-ion conductivity, so that it is possible to adjust lithium-ion conductivity by the kind of the solvent.

Also, the above electrolytic solution can include an additive. As the additive, there may be mentioned carbonate compounds such as vinylene carbonate (VC) used in the above-mentioned electrode material mixture layer slurry.

The concentration of the supporting electrolyte in the electrolytic solution for a lithium-ion secondary battery is normally 1 to 30 wt %, preferably 5 wt % to 20 wt %. Also, depending on the kind of the supporting electrolyte, it is normally used in a concentration of 0.5 to 2.5 mol/L. When the concentration of the supporting electrolyte is either too low or too high, ion conductivity tends to be lowered. Lower concentration of the electrolytic solution results in increased degree of swelling of the polymer particle, so that it is possible to adjust lithium-ion conductivity by the concentration of the electrolytic solution.

For an electrolytic solution other than the above-mentioned solutions, there may be mentioned polymer electrolyte such as polyethylene oxide and polyacrylonitril, gel-like polymer electrolyte in which the above polymer electrolyte is impregnated with the electrolytic solution, inorganic solid electrolyte such as LiI and $Li_3N$.

As the separator, there may be mentioned organic separator exemplified as the above-mentioned separator for a secondary battery. For a positive electrode and a negative electrode, those obtained by adhering the electrode material mixture layer including binder for an electrode material mixture layer and electrode active material to a collector as exemplified for the above-mentioned electrode for a secondary battery.

In the secondary battery of the present invention, the electrode for a secondary battery may be used as the positive electrode and negative electrode on which the porous membrane is layered, and the separator for a secondary battery may be used as the separator on which the porous membrane is layered.

A specific method for manufacturing a lithium-ion secondary battery, there may be mentioned a method in which the positive electrode and the negative electrode are layered via a separator, which is then winded or bended depending on the battery shape to fit in the battery case, followed by filling the electrolyte solution in the battery case and sealing the case. The porous membrane of the present invention may be formed on any of the positive electrode, the negative electrode and the separator. Also, only the porous membrane can be layered independently. Also, as needed, it is possible to prevent pressure increase inside the battery and overcharge-overdischarge by setting in expanded metal, overcurrent protection element such as fuse and PTC element, and lead plate, etc. The shape of the battery may include coin shape, button shape, sheet shape, cylinder shape, square shape and flattened shape.

EXAMPLES

Hereinafter, the present invention will be explained based on examples, but the present invention is not limited to these examples. Note that "part" and % are based on weight in the present examples unless otherwise stated.

A variety of physical properties in the following examples and comparative examples are evaluated as follows.

<Characteristic of Slurry for Porous Membrane: Slurry Stability>

According to JIS Z8803:1991, slurry viscosity ($\eta_{1h}$) after 1 hour of the slurry manufacturing and slurry viscosity ($\eta_{5h}$) after 5 hours of the slurry manufacturing were respectively measured by a single cylindrical rotational viscometer (25° C., rotation number=60 rpm, spindle shape:4), then slurry viscosity change rate was calculated by the following formula and determined by the following criterion. The lower the viscosity change rate is, the better the slurry stability is.

Slurry viscosity change rate (%)=100×($\eta_{5h}$-$\eta_{1h}$)/$\eta_{1h}$

A: less than 10%
B: 10% or more to less than 20%
C: 20% or more to less than 30%
D: more than 30%

<Characteristic of Slurry for Porous Membrane: Dispersibility>

Slurry for porous membrane was put into a test tube of 1 cm in diameter up to a height of 5 cm to make a test sample. 5 test samples were prepared to measure 1 kind of sample. The above test samples were vertically placed on a desk. Conditions of the placed slurry for porous membrane were observed for 10 days, and were determined by the following criterion. Time hour taken for sedimentation of 5 samples were respectively obtained, and then, the average time required for sedimentation (days) thereof was obtained, which was determined as a day when sedimentation was observed. The less biphasic separation is seen, superior the dispersibility is.
A: Biphasic separation was not seen even after 10 days.
B: Biphasic separation was seen after 6 to 10 days.
C: Biphasic separation was seen after 2 to 5 days.
D: Biphasic separation was seen after 1 day.
E: Biphasic separation was seen within 3 hours.

<Electrode Properties: Flexibility>

An electrode or separator was cut to a rectangle of width 3 cm×length 9 cm and made to a test piece. The test piece was put on a desk, uncoated with the slurry for porous membrane-side down, and then a stainless pole, 1 mm in diameter, was laid along lateral direction in a center of longitudinal direction (located 2.5 cm from edge) on the uncoated side. The test piece was folded by 180-degree centering around the stainless pole, that the porous membrane layer became external side. 10 pieces of the test piece were tested, presence or absence of crack or remove was observed at folded part of the porous membrane layer for each test piece, and then determined by the following criterion. Less the crack or remove is, superior the flexibility of the porous membrane, namely, the tensile strength is.
A: Crack or remove was not seen in all 10 pieces.
B: Crack or remove was seen in 1 to 3 pieces out of 10 pieces.
C: Crack or remove was seen in 4 to 9 pieces out of 10 pieces.
D: Crack or remove was seen in all 10 pieces.

<Battery Properties: Rate Characteristics>

10 cells of coin shaped full cell batteries were charged to 4.3V by a constant current method of 0.1 C, followed by discharging to 3.0V at 0.1 C to obtain 0.1 C-discharge capacity a. Then, the batteries were charged to 4.3V by a constant current method of 0.1 C, followed by discharging to 3.0V at 1 C to obtain 1 C-discharge capacity b. An average value of 10 cells was determined a measurement value. The capacity retention rate was obtained as a rate of electrical capacities expressed by 1 C-discharge capacity "b" and 0.1 C-discharge capacity "a" (=b/a×100(%)), which was determined as an evaluative criterion for rate characteristic. Higher value indicates more excellent rate characteristics.
SA: 93% or more
A: 90% or more to less than 93%
B: 80% or more to less than 90%
C: 50% or more to less than 80%
D: less than 50%

<Battery Properties: High-Temperature Cycle Characteristics>

10 cells of coin shaped full cell batteries were subject to discharge and charge repeatedly, in which the batteries were charged to 4.3V by a constant current method of 0.2 C under 50° C. atmosphere, followed by discharging to 3.0V, and then electrical capacities were measured. An average value of 10 cells was determined a measurement value.

Discharge-charge capacity retention rate was obtained as a rate of electrical capacity "x" after 50 cycles and electrical capacity "y" after 5 cycles (=x/y×100(%)), which was determined as an evaluative criterion for cycle characteristic. Higher value indicates more excellent high-temperature cycle characteristics.
SA: 85% or more
A: 80% or more to less than 85%
B: 70% or more to less than 80%
C: 50% or more to less than 70%
D: 30% or more to less than 50%
E: less than 30%

Example 1

<Production of Polymer>

300 parts of ion-exchange water, 48.5 parts of n-butyl acrylate, 41.5 parts of ethyl acrylate, 5 parts of acrylonitrile, 5 parts of styrene, 20 parts of sodium dodecylbenzene-sulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and initiated polymerization. When polymerization conversion rate obtained from solid content concentration became approximately 98%, 200 parts of ion-exchange water, 5 parts of n-butyl acrylate, 76 parts of ethyl acrylate, 16.5 parts of acrylonitrile, 2.0 parts of glycidyl methacrylate, 0.5 parts of 2-acrylamide2-methyl propane sulfonic acid, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle A. Polymerization conversion rate obtained from solid content concentration was approximately 99%. It was confirmed that the obtained polymer particle A is a polymer particle having hetero phase structure comprising internal layer and outer layer. Further, in said polymer particle A, glass-transition temperature of the internal layer was –20° C., while that of the outer layer was 0° C. In said polymer particle A, ratio of the internal layer and the outer layer was 50:50. Further, number average particle diameter of polymer particle A was 300 nm. Total content ratio of epoxy group and sulfonic acid group in the outer layer of polymer particle A, as a ratio of monomers (glycidyl methacrylate, 2-acrylamide2-methyl propane sulfonic acid), was 2.5%. Ratio of polymerization unit in (meth)acrylonitrile and (meth)acrylic acid esters in the outer layer was 97.5%. Content ratio of vinyl monomer component in the internal layer, as a ratio of monomers, was 100%. Results are shown in Table 1.

<Manufacturing Slurry for Porous Membrane>

Nonconductive particle (aluminum oxide, average particle diameter 0.3 μm, iron content <20 ppm) and polymer A were mixed so as to make content ratio (ratio corresponding to solid content) 100:2.5, water was then mixed so as to make solid content concentration 30%, and then dispersed using bead mill to prepare a slurry for porous membrane. Stability and dispersibility of the obtained slurry for porous membrane were measured. Results are shown in Table 2.

<Production of Electrode Composition for Negative Electrode and Negative Electrode>

98 parts of graphite having a particle diameter of 20 μm and specific surface area of 4.2 m²/g as the negative electrode active material and 5 parts of PVDF (polyvinylidene fluoride) in terms of solid content as the binder for a negative electrode material mixture layer were mixed, and further added with N-methylpyrrolidone followed by mixing by planetary mixer to prepare an electrode composition for a negative electrode in slurry-state (negative electrode material mixture layer forming slurry). The electrode composition for a negative electrode was applied on one side of copper foil having a thickness of 10 μm, and dried at 110° C. for 3 hours, followed by roll press to obtain a negative electrode having a negative electrode material mixture layer with a thickness of 60 μm.

<Production of Electrode Composition for Positive Electrode and Positive Electrode>

3 parts of PVDF (polyvinylidene fluoride) in terms of solid content as the binder for a positive electrode material mixture layer, 2 parts of acetylene black and 20 parts of N-methylpyrrolidone were added to 95 parts of lithium manganate having a spinel structure as the positive electrode active material, and then mixed by planetary mixer to produce a positive electrode in slurry-state (positive electrode material mixture layer forming slurry). The electrode composition for a positive electrode was applied on an aluminum foil having a thickness of 18 μm, and dried at 120° C. for 3 hours, followed by roll press to obtain a positive electrode having a positive electrode material mixture layer with a thickness of 70 μm.

<Preparation of Electrode with Porous Membrane>

The above slurry for porous membrane was coated on the negative electrode so as to completely cover the negative electrode active material layer to have a thickness of 3 μm, and then dried at 110° C. for 20 minutes, so that the porous membrane was formed to obtain an electrode with porous membrane. Flexibility of the produced electrode with porous membrane was evaluated. Results are shown in Table 2.

<Preparation of Battery>

Then, the obtained positive electrode and the negative electrode were cut into a circular form having a diameter of 13 mm and a diameter of 14 mm, respectively. A separator of a circular-formed polypropylene-made porous membrane, having a diameter of 18 mm and thickness of 25 μm, was placed on a side of the positive electrode active material layer of the positive electrode. They were arranged so as to make their electrode active material layers face each other and to make the aluminum foil of the positive electrode contact with the bottom face of an outer case. Expanded metal was further placed on the copper foil of the negative electrode, and the obtained structure was housed in a stainless steel coin shaped outer case (diameter of 20 mm, height of 1.8 mm and stainless steel thickness of 0.25 mm) where polypropylene packing was put. The electrolytic solution (EC/DEC=½, 1M $LiPF_6$) was injected into the case not to leave air, and the outer case was covered with a stainless steel cap having a thickness of 0.2 mm via the polypropylene packing, and fixed, followed by sealing the battery can, so that a lithium-ion secondary battery (coin cell CR2032) having a diameter of 20 mm and a thickness of about 3.2 mm was produced. For the obtained battery, rate characteristics and high-temperature cycle characteristics were measured. The results are shown in Table 2.

Example 2

300 parts of ion-exchange water, 70 parts of n-butyl acrylate, 25 parts of ethyl acrylate, 5 parts of acrylonitrile, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 80 parts of ethyl acrylate, 18 parts of acrylonitrile, 2.0 parts of glycidyl methacrylate, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle B. Polymerization conversion rate obtained from solid content concentration was approximately 99%. It was confirmed that the obtained polymer particle B is a polymer particle having hetero phase structure comprising internal layer and outer layer. Further, in said polymer particle B, glass-transition temperature of the internal layer was –30° C., while that of the outer layer was 5° C. In said polymer particle B, ratio of the internal layer and the outer layer was 50:50. Further, number average particle diameter of polymer particle B was 150 nm. Total content ratio of epoxy group in the outer layer of polymer particle B, as a ratio of monomers (glycidyl methacrylate), was 2.0%. Ratio of polymerization unit in (meth)acrylonitrile and (meth)acrylic acid esters was 98%. Content ratio of vinyl monomer component in the internal layer, as a ratio of monomers, was 100%. Results are shown in Table 1.

Except for using polymer particle B instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 3

300 parts of ion-exchange water, 95 parts of n-butyl acrylate, 5 parts of acrylonitrile, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 70 parts of ethyl acrylate, 18 parts of acrylonitrile, 10 parts of methyl methacrylate, 2.0 parts of glycidyl methacrylate, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle C. Polymerization conversion rate obtained from solid content concentration was approximately 99%. It was confirmed that the obtained polymer particle C is a polymer particle having hetero phase structure comprising internal layer and outer layer. Further, in said polymer particle C, glass-transition temperature of the internal layer was −38° C., while that of the outer layer was 15° C. In said polymer particle C, ratio of the internal layer and the outer layer was 50:50. Further, number average particle diameter of polymer particle C was 200 nm. Total content ratio of epoxy group in the outer layer of polymer particle C, as a ratio of monomers (glycidyl methacrylate), was 2.0%. Ratio of polymerization unit in (meth)acrylonitrile and (meth)acrylic acid esters was 98%. Content ratio of vinyl monomer component in the internal layer, as a ratio of monomers, was 100%. Results are shown in Table 1.

Except for using polymer particle C instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 4

300 parts of ion-exchange water, 85 parts of n-butyl acrylate, 10 parts of acrylonitrile, 5 parts of styrene, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 84.5 parts of ethyl acrylate, 15 parts of acrylonitrile, 0.5 parts of acrylic acid, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle D. Polymerization conversion rate obtained from solid content concentration was approximately 99%. It was confirmed that the obtained polymer particle D is a polymer particle having hetero phase structure comprising internal layer and outer layer. Concentration of the water dispersions of polymer particle D was 8 wt %. Further, in said polymer particle D, glass-transition temperature of the internal layer was −28° C., while that of the outer layer was 0° C. In said polymer particle D, ratio of the internal layer and the outer layer was 50:50. Further, number average particle diameter of polymer particle D was 400 nm. Total content ratio of carboxyl group in the outer layer of polymer particle D, as a ratio of monomers (acrylic acid), was 0.5%. Ratio of polymerization unit in (meth)acrylonitrile and (meth)acrylic acid esters was 99.5%. Content ratio of vinyl monomer component in the internal layer, as a ratio of monomers, was 100%. Results are shown in Table 1.

Except for using polymer particle D instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 5

300 parts of ion-exchange water, 55 parts of n-butyl acrylate, 30 parts of ethyl acrylate, 14 parts of acrylonitrile, 1 part of glycidyl methacrylate, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 69.5 parts of ethyl acrylate, 30 parts of acrylonitrile, 0.5 parts of hydroxyethyl methacrylate, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle E. Polymerization conversion rate obtained from solid content concentration was approximately 99%. It was confirmed that the obtained polymer particle E is a polymer particle having hetero phase structure comprising internal layer and outer layer. Further, in said polymer particle E, glass-transition temperature of the internal layer was −10° C., while that of the outer layer was 15° C. In said polymer particle E, ratio of the internal layer and the outer layer was 50:50. Further, number average particle diameter of polymer particle E was 300 nm. Total content ratio of hydroxy group in the outer layer of polymer particle E, as a ratio of monomers (hydroxyethyl methacrylate), was 0.5%. Ratio of polymerization unit in (meth)acrylonitrile and (meth)acrylic acid esters was 99.5%. Content ratio of vinyl monomer component in the internal layer, as a ratio of monomers, was 100%. Results are shown in Table 1.

Except for using polymer particle E instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 6

<Production of Polymer>

300 parts of ion-exchange water, 48.5 parts of n-butyl acrylate, 41.5 parts of ethyl acrylate, 5 parts of acrylonitrile, 5 parts of styrene, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 5 parts of n-butyl acrylate, 76 parts of ethyl acrylate, 16.5 parts of acrylonitrile, 2 parts of glycidyl methacrylate, 0.5 parts of hydroxyethyl methacrylate, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle F. Polymerization conversion rate obtained from solid content concentration was approximately 99%. It was confirmed that the obtained polymer particle F is a polymer particle having hetero phase structure comprising internal layer and outer layer. Further, in said polymer particle F, glass-transition temperature of the internal layer was −20° C., while that of the outer layer was 0° C. In said polymer particle F, ratio of the internal layer and the outer layer was 50:50. Further, number average particle diameter of polymer particle F was 300 nm. Total content ratio of epoxy group and hydroxy group in the outer layer of polymer particle F, as a ratio of monomers (glycidyl methacrylate, hydroxyethyl methacrylate), was 2.5%. Ratio of polymerization unit in (meth)acrylonitrile and (meth)acrylic acid esters was 97.5%. Content ratio of vinyl monomer component in the internal layer, as a ratio of monomers, was 100%. Results are shown in Table 1.

Except for using polymer particle F instead of polymer particle A, slurry for porous membrane was manufactured as is the same with Example 1. And then, stability and dispersibility of the slurry for porous membrane were evaluated. Results are shown in Table 2.

<Preparation of Separator with Porous Membrane>

The above-mentioned slurry for porous membrane was coated on a single-layered polypropylene separator (porosity of 55%), having a width of 65 mm, a length of 500 mm, and thickness of 25 μm, produced by the dry method, using wire bar so that the coating become a thickness of 3 μm after drying. And then, the resultant was dried at 80° C. for 30 minutes to form a porous membrane, which lead to obtain separator with porous membrane. Flexibility of the obtained separator with porous membrane was evaluated. Results are shown in Table 2.

<Preparation of Battery>

Then, the obtained positive electrode, the negative electrode, and separator with porous membrane were cut into a circular form having a diameter of 13 mm, a diameter of 14 mm, and a diameter of 18 mm respectively. The separator with porous membrane was placed on a side of the positive electrode material mixture layer of the positive electrode to make porous membrane layer face the side of the positive electrode material mixture layer, the electrode material mixture layers were facing each other, and the aluminum foil of the positive electrode contacted with the bottom face of an outer case. Expanded metal was further placed on the copper foil of the negative electrode, and the obtained structure was housed in a stainless steel coin shaped outer case (diameter of 20 mm, height of 1.8 mm and stainless steel thickness of 0.25 mm) where polypropylene packing was put. The electrolytic solution (EC/DEC=½, 1M $LiPF_6$) was injected into the case not to leave air, and the outer case was covered with a stainless steel cap having a thickness of 0.2 mm via the polypropylene packing, and fixed, followed by sealing the battery can, so that a coin shaped full cell battery having a diameter of 20 mm and a thickness of about 3.2 mm (coin cell CR2032) was produced. For the obtained rate characteristics and high-temperature cycle characteristics were measured. The results are shown in Table 2.

Example 7

Except for using plate-like boehmite (average particle diameter of 1 μm, aspect ratio of 10) instead of aluminum oxide, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 8

Except for using aromatic polyamide short fiber (short fiber having fineness of single fiber: 0.55 dtex (0.5 de) and cut length: 1 mm made of copolyparaphenylene-3,4'-oxydiphenyleneterephthalic amide, having an aspect ratio of 200 and a melting point of 187° C., "TECHNORA" by Teijin Limited) instead of aluminum oxide, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 9

Except for using polyphenylene sulfide short fiber (a melting point of 285° C., aspect ratio of 200) instead of aluminum oxide, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Example 10

Except for using aromatic polyamide short fiber (short fiber having fineness of single fiber: 0.55 dtex (0.5 de) and cut length: 1 mm made of copolyparaphenylene-3,4'-oxydiphenyleneterephthalic amide, having an aspect ratio of 200 and a melting point of 187° C., "TECHNORA" by Teijin Limited) instead of aluminum oxide, slurry for porous membrane, an electrode with the porous membrane, and a battery were manufactured as is the same with Example 6. And, as is the same with Example 6, stability and dispersibility of the slurry for porous membrane, flexibility of the separator with the porous membrane, rate characteristic and a high-temperature cycle characteristics of the battery were evaluated. Results are shown in Table 2.

Comparative Example 1

Except for using polyacrylonitrile (PAN) particles instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Comparative Example 2

Except for using polyvinylidene difluoride (PVDF) particles instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Comparative Example 3

Except for using poly(butyl)acrylate (PBA) particles instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Comparative Example 4

300 parts of ion-exchange water, 48.5 parts of n-butyl acrylate, 41.5 parts of ethyl acrylate, 10 parts of acrylonitrile, 20 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized. When polymerization conversion rate obtained from solid content concentration became approximately 98%, 200 parts of ion-exchange water, 5 parts of n-butyl acrylate, 78 parts of ethyl acrylate, 17 parts of acrylonitrile, 10 parts of sodium dodecylbenzenesulfonate, 0.05 parts of t-dodecylmercaptan as molecular weight modifier, and 0.3 parts of potassium persulfate as polymerization initiator were put into the autoclave with stirrer, sufficiently stirred, and then heated to 70° C. to polymerize and obtained water dispersions of polymer particle G. Polymerization conversion rate obtained from solid content concentration was approximately 99%. It was confirmed that the obtained polymer particle G is a polymer particle having hetero phase structure comprising internal layer and outer layer. Further, in said polymer particle G, glass-transition temperature of the internal layer was −20° C., while that of the outer layer was 0° C. In said polymer particle G, ratio of the internal layer and the outer layer was 50:50. Further, number average particle diameter of polymer particle G was 400 nm. Content ratio of hydrophically-functional group in the outer layer of polymer particle G was 0%. Ratio of polymerization unit in (meth)acrylonitrile and (meth)acrylic acid esters in the outer layer was 100%. Content ratio of vinyl monomer component in the internal layer, as a ratio of monomers, was 100%. Results are shown in Table 1.

Except for using polymer particle G instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

Comparative Example 5

<Production of Polymer>

200 parts of ion-exchange water, 66.9 parts of n-butyl acrylate, 16 parts of ethyl acrylate, 16.5 parts of acrylonitrile, 0.5 part of glycidyl methacrylate, 0.1 part of 2-acrylamide2-methylpropanesulfonic acid, 10 parts of sodium dodecylbenzenesulfonate, 0.05 parts of t-dodecylmercaptan as molecular weight modifier, and 0.3 parts of potassium persulfate as polymerization initiator were put into an autoclave with stirrer, sufficiently stirred, and then heated to 80° C. and polymerized to obtain water dispersions of polymer particle H. Polymerization conversion rate obtained from solid content concentration was approximately 98%. It was confirmed that polymer particle H is a polymer particle having a single phase structure. Glass-transition temperature of the polymer particle H was −10° C., number average particle diameter of polymer particle H was 100 nm. Results are shown in Table 1. Total content ratio of epoxy group and sulfonic acid group in polymer particle H was 0.6%, as a ratio of monomers (glycidyl methacrylate, 2-acrylamide2-methyl propane sulfonic acid).

Except for using polymer particle H instead of polymer particle A, slurry for porous membrane, an electrode with the porous membrane, and a battery were manufactured as is the same with Example 1. And, as is the same with Example 1, stability and dispersibility of the slurry for porous membrane, flexibility of the electrode with the porous membrane, rate characteristic and a high-temperature cycle characteristics of the battery were evaluated. Results are shown in Table 2.

TABLE 1

| Kinds | Hydrophilic Functional Group Content Ratio (wt %) |
|---|---|
| sulfonic acid group, epoxy group | 2.5 |
| epoxy group | 2.0 |
| epoxy group | 2.0 |
| carboxyl group | 0.5 |
| hydroxy group | 0.5 |
| hydroxy group, epoxy group | 2.5 |
| sulfonic acid group, epoxy group | 2.5 |
| sulfonic acid group, epoxy group | 2.5 |
| sulfonic acid group, epoxy group | 2.5 |
| hydroxy group, epoxy group | 2.5 |
| — | 0 |
| — | 0 |
| — | 0 |
| — | 0 |
| sulfonic acid group, epoxy group | 0.6 |

TABLE 2

|  | Polymer | Polymer Particle Structure | Configuration | Non-conductive Particles | Slurry Dispersibility | Slurry Stability | Flexibility | Rate Characteristic | High-Temperature Cycle Characteristic |
|---|---|---|---|---|---|---|---|---|---|
| Ex. 1 | Polymer A | Hetero-Phase Structure | Electrode | Aluminium Oxide Average Particle Diameter of 0.3 μm | A | A | A | A | A |
| Ex. 2 | Polymer B | Hetero-Phase Structure | Electrode | Aluminium Oxide Average Particle Diameter of 0.3 μm | A | A | A | B | B |
| Ex. 3 | Polymer C | Hetero-Phase Structure | Electrode | Aluminium Oxide Average Particle Diameter of 0.3 μm | A | A | A | B | B |
| Ex. 4 | Polymer D | Hetero-Phase Structure | Electrode | Aluminium Oxide Average Particle Diameter of 0.3 μm | A | A | B | B | C |
| Ex. 5 | Polymer E | Hetero-Phase Structure | Electrode | Aluminium Oxide Average Particle Diameter of 0.3 μm | B | A | A | B | B |
| Ex. 6 | Polymer F | Hetero-Phase Structure | Separator | Aluminium Oxide Average Particle Diameter of 0.3 μm | A | A | A | A | A |
| Ex. 7 | Polymer A | Hetero-Phase Structure | Electrode | Plate-Like Boehmite | A | A | B | A | A |
| Ex. 8 | Polymer A | Hetero-Phase Structure | Electrode | Aromatic Polyamide Short Fiber | A | A | A | SA | SA |
| Ex. 9 | Polymer A | Hetero-Phase Structure | Electrode | Polyphenylene Sulfide Short Fiber | A | A | A | A | SA |
| Ex. 10 | Polymer A | Hetero-Phase Structure | Separator | Aromatic Polyamide Short Fiber | A | A | A | SA | SA |
| Comp. Ex. 1 | PAN | Single-Phase Structure | Electrode | Aluminium Oxide Average Particle Diameter of 0.3 μm | C | B | C | C | C |
| Comp. Ex. 2 | PVDF | Single-Phase Structure | Electrode | Aluminium Oxide Average Particle Diameter of 0.3 μm | D | C | C | C | C |
| Comp. Ex. 3 | P B A | Single-Phase Structure | Electrode | Aluminium Oxide Average Particle Diameter of 0.3 μm | C | B | C | C | C |
| Comp. Ex. 4 | Polymer G | Hetero-Phase Structure | Electrode | Aluminium Oxide Average Particle Diameter of 0.3 μm | C | B | C | B | C |
| Comp. Ex. 5 | Polymer H | Single-Phase Structure | Electrode | Aluminium Oxide Average Particle Diameter of 0.3 μm | C | C | B | B | C |

As can be seen from Tables 1 and 2, when polymer particles having hetero phase structure, in which internal layer is a polymer wherein vinyl monomer components are polymerized and outer layer is a polymer wherein monomer components containing a hydrophilic functional group are polymerized, are used as a binder for porous membrane, strength of a porous membrane improved while maintaining lithium-ion conductivity and a high rate characteristic and a high temperature cycle characteristics were shown while inhibiting break of a porous membrane.

On the other hand, when polymer particles of a single layer structure was used for the binder for porous membrane (Comp Ex. 1 to 3 and 5) or when polymer particles of a hetero phase structure, wherein its outer layer does not include monomer components containing hydrophilic functional group, was used for the binder for porous membrane (Comp Ex. 4), slurry stability slurry dispersibility, flexibility of a porous membrane, rate characteristic and a high-temperature cycle characteristics were deteriorated.

The invention claimed is:

1. A porous membrane for a secondary battery comprising a binder for the porous membrane and a nonconductive particle,
wherein the binder for the porous membrane is a polymer particle having a hetero phase structure, in which internal layer is a polymer wherein vinyl monomer components are polymerized and outer layer is a polymer wherein monomer components containing a hydrophilic functional group are polymerized,
the nonconductive particle is different from the polymer particle,
the polymer of the internal layer and the polymer of the outer layer have a different chemical structure, and
the vinyl monomer components include at least any one of aliphatic vinyl monomer, (meth)acrylic acid ester monomer, amide group-containing (meth)acrylic monomer, multifunctional di(meth)acrylic monomer or aromatic vinyl monomer.

2. The porous membrane for a secondary battery as set forth in claim 1, wherein the hydrophilic functional group is at least one selected from the group consisting of sulfonic acid group, carboxyl group, hydroxyl group and epoxy group.

3. The porous membrane for a secondary battery as set forth in claim 1, wherein the outer layer is a polymer comprising a polymerization unit of (meth)acrylonitrile and that of (meth)acrylic acid esters.

4. A slurry of porous membrane for a secondary battery comprising a binder for the porous membrane, a nonconductive particle and a solvent,
wherein the binder for the porous membrane is a polymer particle having a hetero phase structure, in which internal layer is a polymer wherein vinyl monomer components are polymerized and outer layer is a polymer wherein monomer components containing a hydrophilic functional group are polymerized, the nonconductive particle is different from the polymer particle, the polymer of the internal layer and the polymer of the outer layer have a different chemical structure, and the vinyl monomer components include at least any one of aliphatic vinyl monomer, (meth)acrlic acid ester monomer, amide group-containing (meth)acrlic monomer, multifunctional di(meth)acrylic monomer or aromatic vinyl monomer.

5. A manufacturing method of a porous membrane for a secondary battery comprising steps of:

coating a slurry of a porous membrane for a secondary battery comprising a binder for the porous membrane, a nonconductive particle and a solvent, wherein the binder for porous membrane is a polymer particle having a hetero phase structure, in which internal layer is a polymer wherein vinyl monomer components are polymerized and outer layer is a polymer wherein monomer components having a hydrophilic functional group are polymerized, the nonconductive particle is different from the polymer particle, the polymer of the internal layer and the polymer of the outer layer have a different chemical structure, and the vinyl monomer components include at least any one of aliphatic vinyl monomer, (meth)acrylic acid ester monomer, amide group-containing (meth)acrylic monomer, multifunctional di(meth)acrylic monomer or aromatic vinyl monomer, on a base material, and drying the slurry coated base material.

6. A secondary battery electrode, wherein an electrode material mixture layer, comprising a binder for the electrode material mixture layer and an electrode active material, is adhered to a collector; and the porous membrane as set forth in claim 1 is on a surface of the electrode material mixture layer.

7. A separator for a secondary battery, wherein the porous membrane as set forth in claim 1 is on an organic separator.

8. A secondary battery comprising a positive electrode, a negative electrode, a separator and an electrolytic solution, wherein at least any one of the above positive electrode, negative electrode and separator has the porous membrane as set forth in claim 1.

9. The porous membrane for a secondary battery as set forth in claim 2, in which a glass-transition temperature of the polymer of the internal layer is $-60°$ C. or more to $20°$ C. or less and a glass-transition temperature of the polymer of the outer layer is $0°$ C. or more.

10. A secondary battery electrode, wherein an electrode material mixture layer, comprising a binder for the electrode material mixture layer and an electrode active material, is adhered to a collector; and the porous membrane as set forth in claim 2 is on a surface of the electrode material mixture layer.

11. A separator for a secondary battery, wherein the porous membrane as set forth in claim 2 is on an organic separator.

12. A secondary battery comprising a positive electrode, a negative electrode, a separator and an electrolytic solution, wherein at least any one of the above positive electrode, negative electrode and separator has the porous membrane as set forth in claim 2.

13. The porous membrane for a secondary battery as set forth in claim 1, in which a glass-transition temperature of the polymer of the internal layer is $-60°$ C. or more to $20°$ C. or less and a glass-transition temperature of the polymer of the outer layer is $0°$ C. or more.

14. A secondary battery electrode, wherein an electrode material mixture layer, comprising a binder for the electrode material mixture layer and an electrode active material, is adhered to a collector; and the porous membrane as set forth in claim 13 is on a surface of the electrode material mixture layer.

15. A separator for a secondary battery, wherein the porous membrane as set forth in claim 13 is on an organic separator.

16. A secondary battery comprising a positive electrode, a negative electrode, a separator and an electrolytic solution, wherein at least any one of the above positive electrode, negative electrode and separator has the porous membrane as set forth in claim 13.

* * * * *